United States Patent
Nakajima

(10) Patent No.: US 7,158,129 B2
(45) Date of Patent: Jan. 2, 2007

(54) INPUT DEVICE AND INPUT AND OUTPUT DEVICE

(75) Inventor: Mutsumi Nakajima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 444 days.

(21) Appl. No.: 10/272,595

(22) Filed: Oct. 15, 2002

(65) Prior Publication Data

US 2003/0076295 A1 Apr. 24, 2003

(30) Foreign Application Priority Data

Oct. 22, 2001 (JP) ............................. 2001-323605

(51) Int. Cl.
*G09G 5/00* (2006.01)
*G09G 3/36* (2006.01)

(52) U.S. Cl. .......................... 345/207; 345/92; 345/91; 345/90; 345/175

(58) Field of Classification Search .................. 345/76, 345/55, 90–101, 175, 207
See application file for complete search history.

(56) References Cited

U.S. PATENT DOCUMENTS

| 5,204,661 | A | * | 4/1993 | Hack et al. | ................... | 345/88 |
| 5,589,847 | A | * | 12/1996 | Lewis | ........................... | 345/98 |
| 5,945,972 | A | * | 8/1999 | Okumura et al. | .............. | 345/98 |
| 6,441,560 | B1 | * | 8/2002 | Hunter | ........................ | 345/76 |
| 6,489,631 | B1 | * | 12/2002 | Young et al. | .................. | 257/59 |
| 6,542,138 | B1 | * | 4/2003 | Shannon et al. | .............. | 345/76 |
| 6,559,433 | B1 | * | 5/2003 | Ozawa | ........................ | 345/100 |
| 6,738,031 | B1 | * | 5/2004 | Young et al. | .................. | 345/55 |
| 6,867,752 | B1 | * | 3/2005 | Yamazaki et al. | ............. | 345/92 |
| 6,876,353 | B1 | * | 4/2005 | Morosawa et al. | ......... | 345/100 |
| 2001/0052597 | A1 | * | 12/2001 | Young et al. | .................. | 257/59 |
| 2003/0122747 | A1 | * | 7/2003 | Shannon et al. | .............. | 345/76 |

FOREIGN PATENT DOCUMENTS

| JP | 58-066142 | 4/1983 |
| JP | 07-322005 | 12/1995 |

OTHER PUBLICATIONS

M. Yamaguchi, et al. "Two-Dimensional Contact-type Image Sensor Using Amorphous Silicon Photo-Transistor", Central Research Laboratory, Hitachi, Ltd., ITE Technical Report, vol. 17, No. 16, Mar. 1993, pp. 19-24.

(Continued)

*Primary Examiner*—Kee M. Tung
*Assistant Examiner*—Chante Harrison
(74) *Attorney, Agent, or Firm*—David G. Conlin; David A. Tucker; Edwards Angell Palmer & Dodge LLP

(57) ABSTRACT

An input device includes: a sense line; a CS line to which an output voltage is applied; a TFT having a control terminal, a first terminal connected to the sense line, and a second terminal connected to the CS line, the first control terminal being supplied an input signal so that a conductivity between the first and second terminals is controlled; a photo-sensor having a first terminal which is connected to the control terminal of the TFT; and a holding capacitance, connected in parallel to the photo-sensor, having a terminal on an opposite side of the control terminal, to which a holding voltage is supplied, and in the input device, a voltage of the CS line is outputted as a detection signal to the sense line via the TFT.

26 Claims, 17 Drawing Sheets

OTHER PUBLICATIONS

K. Kobayashi, et al. "Amorphous Silicon 2-dimensional Image Sensor and its Applications ", Fuji Xerox Co., Ltd., Electronic Imaging and Devices Research Laboratory, ITE Technical Report, vol. 17, No. 16, Mar. 1993, pp. 25-30.

* cited by examiner

INPUT DEVICE AND INPUT AND OUTPUT DEVICE

FIELD OF THE INVENTION

The present invention relates to an input device and an input and output device to which input operation is carried out by an input pen including, for example, a light-emitting element.

BACKGROUND OF THE INVENTION

Conventionally, various types of input-and output devices, to which input operation is carried out by an input pen including, for example, a light-emitting element, have been developed as a portable device. In these input and output devices, a large number of sensor sections each including photo-diode are aligned over the surface of a panel, and input operation is carried out by an electromotive force or a resistance change of the photo-diodes receiving light from the input pen. For example, the following documents specifically disclose an arrangement of such an input and output device:

(1) Japanese Laid-Open Patent Application No. 66142/1983 (Tokukaisho 58-66142, published on Apr. 20, 1983);

(2) "Amorphous Silicon Two-Dimensional Image Sensor and its Applications", ITE Technical Report Vol. 17 No. 16 pp25–30 (published on Mar. 4, 1993);

(3) "Two-Dimensional Contact-type Image Sensor Using Amorphous Silicon Photo-Transistor", ITE Technical Report Vol. 17 No. 16 pp 19–24 (published on Mar. 4, 1993);

(4) Japanese Laid-Open Patent Application No. 322005/1995 (Tokukaihei 7-322005, published on Dec. 8, 1995); and (5) Japanese Laid-Open Patent Application No. 302593/1992 (Tokukaihei 4-302593, published on Oct. 26, 1992).

Among the above documents, the input and output devices disclosed in the conventional documents (1) to (4) are arranged so that output voltage from the photo-diode can be taken out and sent to an output line. The following will describe such an arrangement more specifically, for example, with the arrangement described in the conventional document (4).

In the input and output device described in the conventional document (4), as shown in FIG. 16, a source line 101 and a gate line 102 are provided in a matrix manner, and further, a grand line 103 and an input and output switching line 104 are provided in parallel with the gate line 102. TFTs 105 to 107, a photo-diode 108, an auxiliary capacitance 109, and a liquid crystal 110 are provided in a pixel formed in the vicinity of each intersection between the source line 101 and the gate line 102.

A gate terminal of the TFT 105 is connected to the gate line 102, a gate terminal of the TFT 106 is connected to the source line 101 via the TFT 105, and a gate terminal of the TFT 107 is connected to the input and output switching line 104. An anode of the photo-diode 108 is connected to the grand line 103. A cathode of the photo-diode 108 is connected to the source line 101 via the TFTs 105 and 107 and to the gate terminal of the TFT 106 via the TFT 107. One terminal of the auxiliary capacitance 109 is connected to the grand line 103, and the other terminal is connected to the source line 101 via the TFT 105, to the photo-diode 108 via the TFT 107, and to the gate terminal of the TFT 106.

In case where this input and output device operates as a sensor, the TFT 107 is always turned ON by a signal supplied from the input and output switching line 104, photoelectric current produced by the photo-diode 108 is stored in the auxiliary capacitance 109, and voltage of the auxiliary capacitance 109 rises. In this state, the gate line 102 is scanned. When a potential of the gate line 102 switches to High, the TFT 105 turns ON, and the voltage of the auxiliary capacitance 109, i.e. a detection signal of the photo-diode 108 is outputted to the source line 101 via the TFT 105.

Further, in case where the input and output device operates as a display, the TFT 107 is always turned OFF by a signal supplied from the input and output switching line 104 so that the photo-diode 108 cannot influence the display of the pixel. In this state, the gate line 102 is scanned. When the potential of the gate line 102 switches to High, the TFT 105 turns ON. A signal of the source line 101 is maintained by the auxiliary capacitance 109, and when a potential of the auxiliary capacitance 109 causes the TFF 106 to turn ON, the liquid crystal 110 conducts display operation in response to voltage supply from an AC source.

In the conventional arrangement, since the output of the photo-diode 108 is read out as the detection signal, the photo-diode 108 needs a high optical sensitivity so that the input and output device can obtain a high sensitivity in the input detection. The input detection with a high sensitivity is difficult to conduct, and a highly sensitive input and output device is also difficult to arrange.

Further, since output level of-the photo-diode 108 is -low, devices such as an amplifier are necessary to output the output signal of the photo-diode 108 as the detection signal of the input and output device. This makes an arrangement of peripheral devices complex. As a result of this, downsizing of the device, for example, an arrangement of an integrated combination of a driver section including the amplifier and an input and output panel including a sensor section is difficult.

Meanwhile, in the input and output device described in the conventional document (5), as shown in FIG. 17, a data wire (source line) 121 and an address wire (gate line) 122 are provided in a matrix manner. Transistors 123 to 127, photoelectric detecting means 128, and electrostatic capacitances 129 and 130 are provided in a pixel formed in the vicinity of each intersection between the data wire 121 and the address wire 122.

In this input and output device, when the gate line 122 (n+1) is supplied a High level voltage, the transistor 123 turns ON, a gate terminal of the transistor 124 is supplied the High level voltage, thereby turning the transistor 124 ON.

Here, in case where light is not incident to the photoelectric detecting means 128, the transistor 125 remains OFF because the transistor 124 is ON even if the High level voltage is supplied to the address wire 122$n$. Moreover, although the transistor 126 turns ON, voltage is not outputted to the data wire 121 because of the transistor 125 being OFF.

On the other hand, when light is incident to the photoelectric detecting means 128, the High level voltage applied from the address wire 122 (n+1) to the gate terminal of the transistor 124, being influenced by output from the photoelectric detecting means 128, is changed to a Low level voltage. As a result of this, the transistor 124 is switched from ON to OFF. Then, when the High level voltage is supplied to the address wire 122$n$, a node 131 has a voltage close to the High level voltage, so that the transistor 125 is switched from OFF to ON, and a node 132 has the High level voltage. Moreover, since the transistor 126 turns ON, the High level voltage is outputted to the data wire 121.

In such an arrangement of the conventional document (5), not the output of the photoelectric detecting means 128, but the High level voltage of the address wire 122 is read out as the detection signal to the data wire 121. Therefore, since the detection signal obtained from the data wire 121 is High level, the input and output device needs no devices for amplifying the detection signal, such as an amplifier, so that it is possible to simplify an arrangement of peripheral devices.

However, in the arrangement of the conventional document (5), High level voltage of the address wire 122, which is read out as the detection signal to the data wire 121, has an extremely high value, for example, +15V. For this reason, for example, a reading circuit of the detection signal, which is provided in a driver circuit of the data wire 121, needs to withstand a high voltage.

Further, in the arrangement of the conventional document (5), to turn the transistor 124 OFF, the output of the photoelectric detecting means 128 is used, and voltage of a node 133 (the gate terminal of the transistor 124) is set in Low level to oppose the High level voltage supplied from the address wire 122 (n+1). Therefore, in order to ensure the transistor 124 to be OFF, the photoelectric detecting means 128 needs a high optical sensitivity. This arises a problem that realization of the input and output device is difficult, or the input and output device costs high to manufacture, if realized.

SUMMARY OF THE INVENTION

An object of the present invention is to provide an input device and an input and output device which have an arrangement to be manufactured easily and at low cost, without requiring a reading circuit of a detection signal which can withstand a high voltage and without requiring a highly sensitive photo-sensor.

In order to achieve the above object, the input device of the present invention includes:

a plurality of output lines;

a plurality of output voltage supply lines to which an output voltage is applied;

a first active element having a first control terminal, a first terminal connected to the output line, and a second terminal connected to the output voltage supply line, the first control terminal being supplied an input signal so that a conductivity between the first and second terminals is controlled;

a photo-sensor having a first terminal which is connected to the first control terminal of the first active element; and an electrostatic capacitance, connected in parallel to the photo-sensor, having a terminal on an opposite side of the first control terminal, to which a holding voltage is supplied.

According to the above arrangement, in response to light input to the input device, the photo-sensor varies a holding voltage of the electrostatic capacitance, which brings the active element into conduction. This makes it possible to take out the output voltage as the detection signal, which is supplied to the output voltage supply line, and to send to the output line via the active element.

Also, the voltage of the output voltage supply line is settable to an appropriately low voltage, so that the reading circuit of the detection signal supplied from the output line does not need to withstand a high voltage.

Further, any photo-sensor can be adopted, provided that it can vary the holding voltage of the electrostatic capacitance with its voltage produced to control the conductivity (conduction/non-conduction) of the active element, and the photo-sensor itself does not require a high optical sensitivity. Therefore, it is possible to arrange the input device easily and at low cost.

Further, the input and output device of the present invention includes:

a plurality of sensor sections; and a plurality of display sections using an electro-optic device to display an image, the sensor section including:

(a) a plurality of output lines;

(b) a plurality of output voltage supply lines to which an output voltage is applied;

(c) a first active element having a first control terminal, a first terminal connected to the output line, and a second terminal connected to the output voltage supply line, the first control terminal being supplied an input signal so that a conductivity between the first and second terminals is controlled;

(d) a photo-sensor having a first terminal which is connected to the first control terminal of the first active element; and (e) an electrostatic capacitance, connected in parallel to the photo-sensor, having a terminal on an opposite side of the first control terminal, to which a holding voltage is supplied.

According to the above arrangement, in the display section, image display is carried out by an electro-optic device. On the other hand, in response to light input in the sensor section, the photo-sensor varies the holding voltage of the electrostatic capacitance, which brings the active element into conduction. This makes it possible to take out the output voltage as the detection signal, which is supplied to the output voltage supply line, and to send to the output line via the active element.

Also, the voltage of the output voltage supply line is settable to an appropriately low voltage, so that the reading circuit of the detection signal supplied from the output line does not need to withstand a high voltage.

Further, any photo-sensor can be adopted, provided that it can vary the holding voltage of the electrostatic capacitance with its voltage produced to control the conductivity (conduction/non-conduction) of the active element, and the photo-sensor itself does not require a high optical sensitivity. Therefore, it is possible to arrange the input device easily and at low cost.

For a fuller understanding of the nature and advantages of the invention, reference should be made to the ensuing detailed description taken in conjunction with the accompanying drawings.

DESCRIPTION OF THE EMBODIMENTS

First Embodiment

Referring to FIGS. 1 through 9, the following will describe one embodiment of the present invention.

Figure 2:
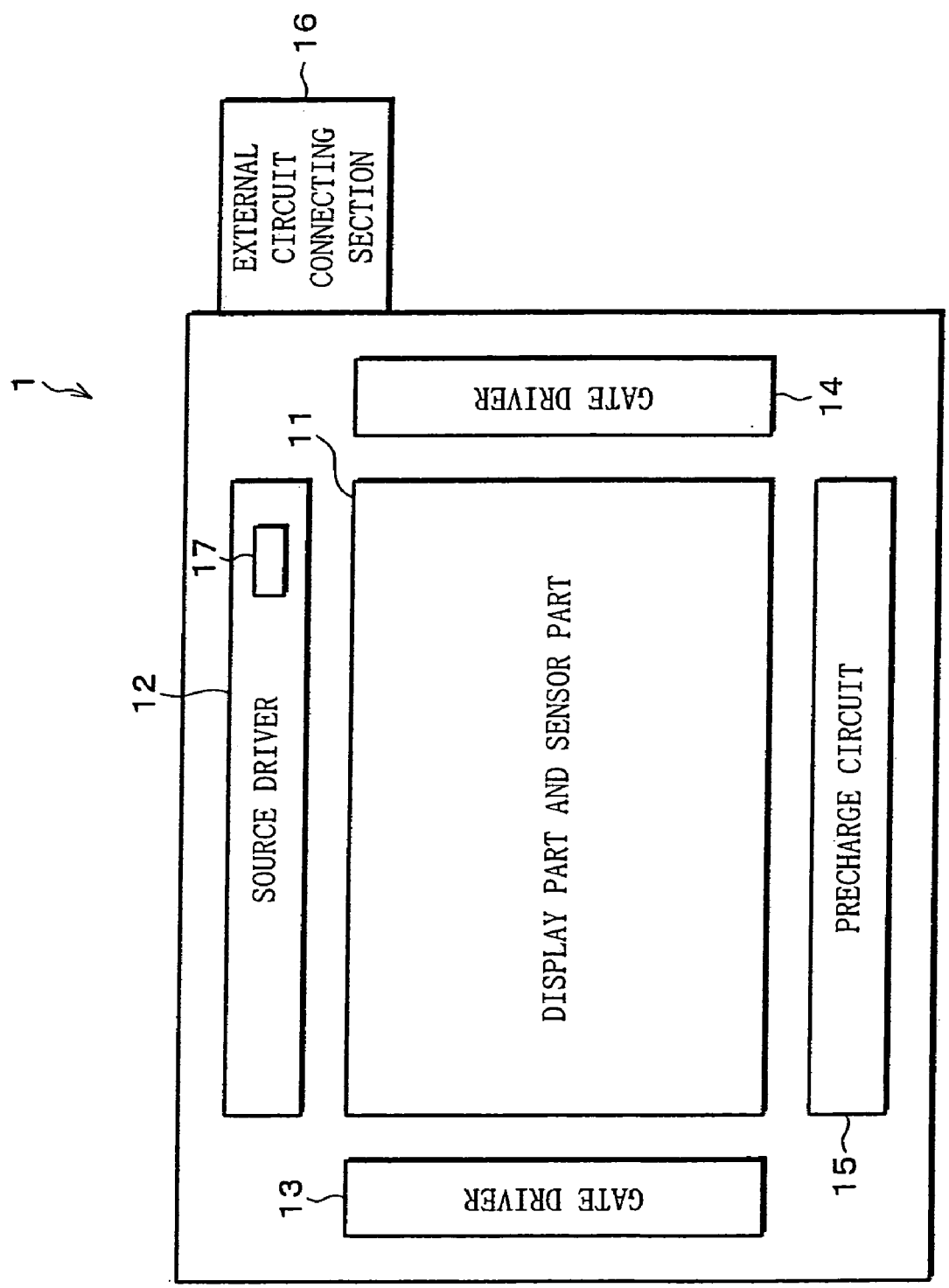
FIG. 2 is a block diagram schematically showing an whole arrangement of the input and output device in one embodiment of the present invention.

An input and output device (input device) 1 of the present embodiment is, as shown in FIG. 2, provided with a sensor and display panel part 11 in its center part. Around the sensor and display panel part 11 provided is a source driver (signal line drive circuit) 12, gate drivers (scanning line drive circuit) 13 and 14, a precharge circuit 15, and an external circuit connecting section 16. The input and output device 1 is arranged in a panel form, for example. Note that, the input and output device 1 shown in FIG. 2 includes the gate drivers 13 and 14 which are provided separately at both sides of the sensor and display panel part 11. However the gate drivers 13 and 14 may be a single component which is provided only at one side of the sensor and display panel part 11.

Figure 1:
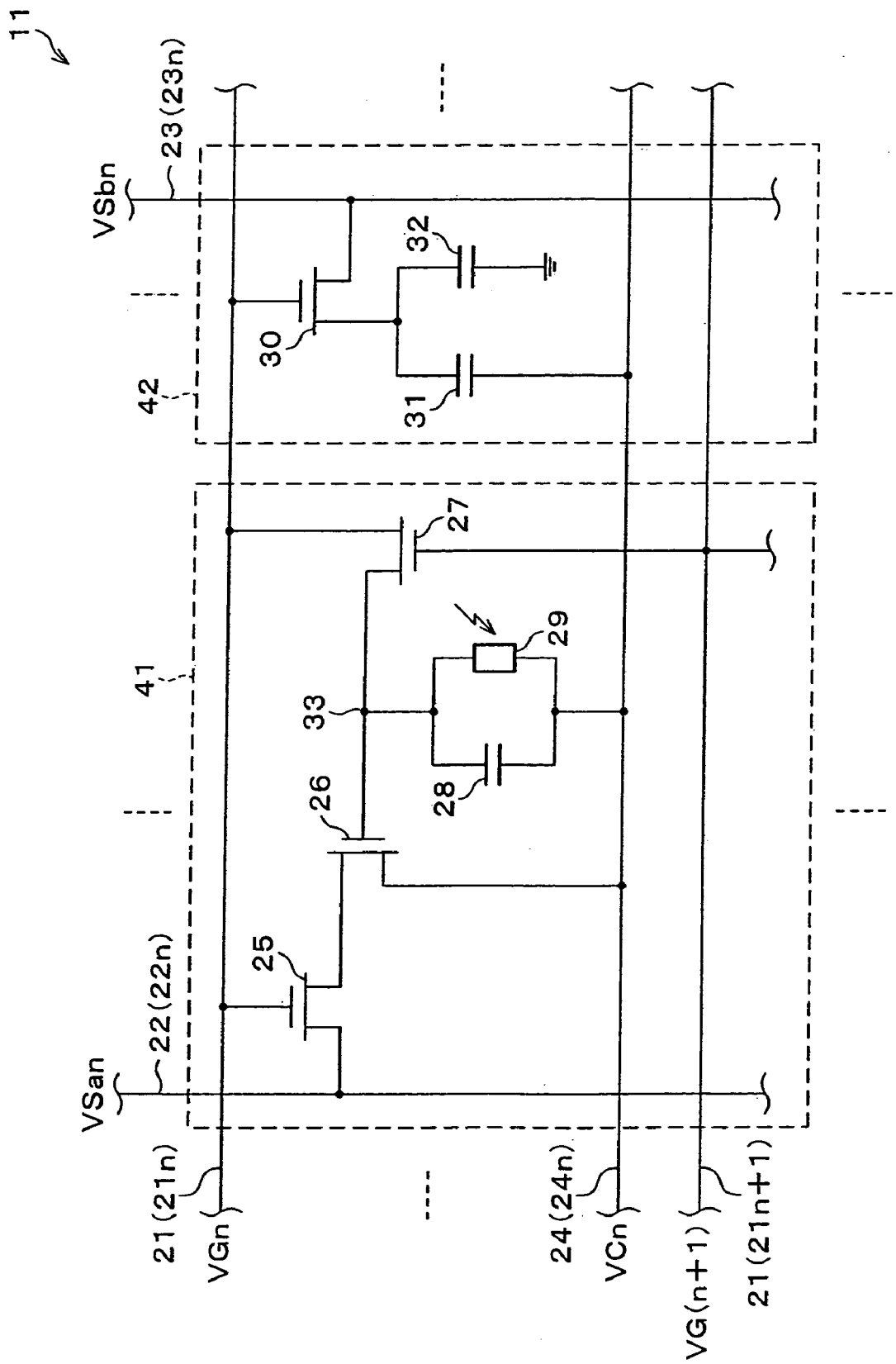
FIG. 1 is a circuit diagram showing an arrangement of a sensor section and a display section which are provided in an input and output device of one embodiment of the present invention.

The sensor and display panel part 11 has a circuit configuration shown in FIG. 1. Note that, FIG. 1 shows an arrangement of one sensor and display area 43 having a sensor section 41 and a display section 42 in combinations. As shown in FIG. 1, the sensor and display panel part 11 is provided with a plurality of gate lines (scanning lines) 21 and a plurality of source lines 23 in a matrix manner, and is provided with sense lines (output lines) 22 in the same direction with respect to the source lines 23. Further, CS lines (output voltage supply line, voltage supply line for holding capacitance) 24 are provided in the same direction with respect to the gate lines 21.

Figure 3:
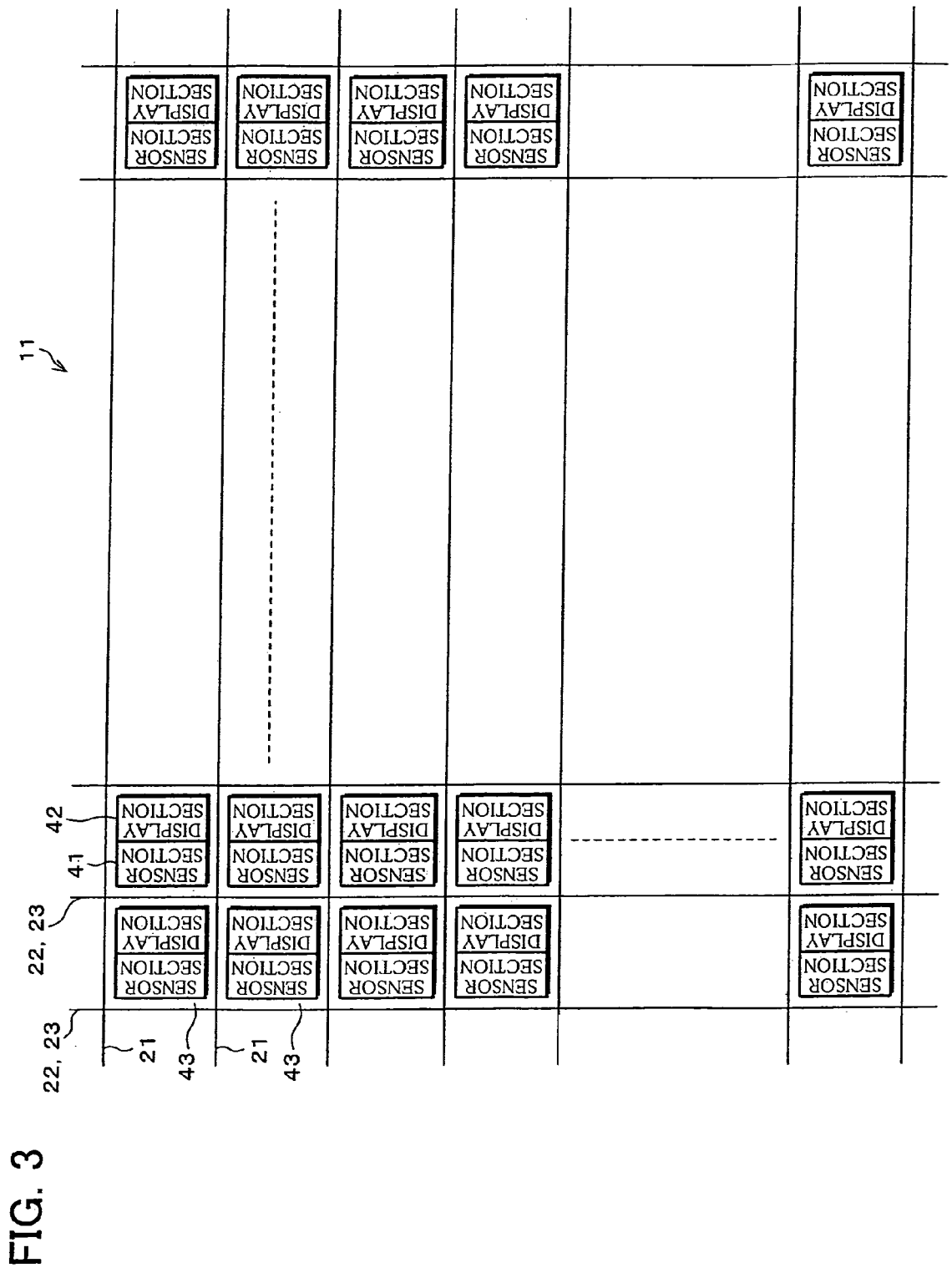
FIG. 3 is an explanatory view showing the case where a sensor and display area having combinations of a sensor section and a display section are provided over the substantially entire surface of a sensor and display panel part shown in FIG. 2.

The sensor section 41 is provided in the vicinity of each intersection between the gate line 21 and the sense line 22, and the display section 42 is provided in the vicinity of each intersection between the gate line 21 and the source line 23. The sensor section 41 and the display section 42 are provided in combination, for example, as shown in FIG. 3, in the sensor and display area 43 surrounded by the adjacent gate lines 21, and the sense line 22 and the source lines 23 which are adjacent.

The sensor section 41 includes a TFT (Thin Film Transistor, a second active element) 25, a TFT (a first active element) 26, a TFT (a third active element) 27, a holding capacitance (electrostatic capacitance) 28, and a photo-sensor 29. The TFT 25 is a switching element for selecting in the sensor section 41, the TFT 26 is a switching element for control of holding a voltage in the holding capacitance 28, and the TFT 27 is a switching element for reset of the holding capacitance 28. The holding capacitance 28 may have not only an apparent structure as an electrostatic capacitance, but also a structure of a parasitic capacitance. The photo-sensor 29 is made of, for example, a photo-diode, and other photoelectric transfer element may be adopted.

The display section 42 includes a TFT (fourth active element) 30, an auxiliary capacitance 31, and a liquid crystal 32. Similarly to the holding capacitance 28, all the auxiliary capacitance 31 does not have a structure as a capacitance, but it may have a structure as a parasitic capacitance.

The gate line 21 is connected to either the gate driver 13 or 14, the sense line 22 is connected to the reading circuit 17 provided in the source driver 12, and the source line 23 is connected to the source driver 12. The CS line 24 serves as an output voltage supply line in the sensor section 41 and serves as a supply line of a predetermined voltage supplied to the auxiliary capacitance 31. The voltage is supplied to the CS line 24 through the external circuit connecting section 16 from the external circuit, or is produced, for example, in circuits provided in the gate drivers 13 and 14 in accordance with the voltage supplied from the external circuit.

In the sensor section 41, with respect to the TFT 25, a gate terminal is connected to the gate line 21 (21n), a drain terminal is connected to the sense line 22 (22n), and a source terminal is connected to a drain terminal of the TFT 26. With respect to the TFT 26, a gate terminal is connected to one terminal of the holding capacitance 28 and the photo-sensor 29, and the source terminal is connected to the CS line 24. The holding capacitance 28 and the photo-sensor 29 are connected in parallel, and the other terminal is connected to the CS line 24. With respect to the TFT 27, a gate terminal is connected to the gate line 21 (21(n+1)) in the subsequent stage, a drain terminal is one terminal of the holding capacitance 28 and the photo-sensor 29, and the source terminal is connected to the gate line 21 (21n). Here, the contact point of one terminal of the holding capacitance 28 and the photo-sensor 29, the TFT 26, and the TFT 27 is a contact point 33.

In the display section 42, with respect to the TFT 30, a gate terminal is connected to the gate line 21 (21n), a drain terminal is connected to one terminal of the auxiliary capacitance 31 and the liquid crystal 32, and a source terminal is connected to the source line 23 (23n). The other terminal of the auxiliary capacitance 31 is connected to the CS line 24, and the liquid crystal 32 is connected to common electrode (not shown). Therefore, the display section 42 has an arrangement similar to that of one pixel in a common liquid display panel.

As described above, the sensor section 41 and the display section 42 in the input and output device 1 share to use the common CS line 24. More specifically, the CS line 24 of the display section 42 also serves as a power line (output voltage supply line) of the sensor section 41.

Figure 4:
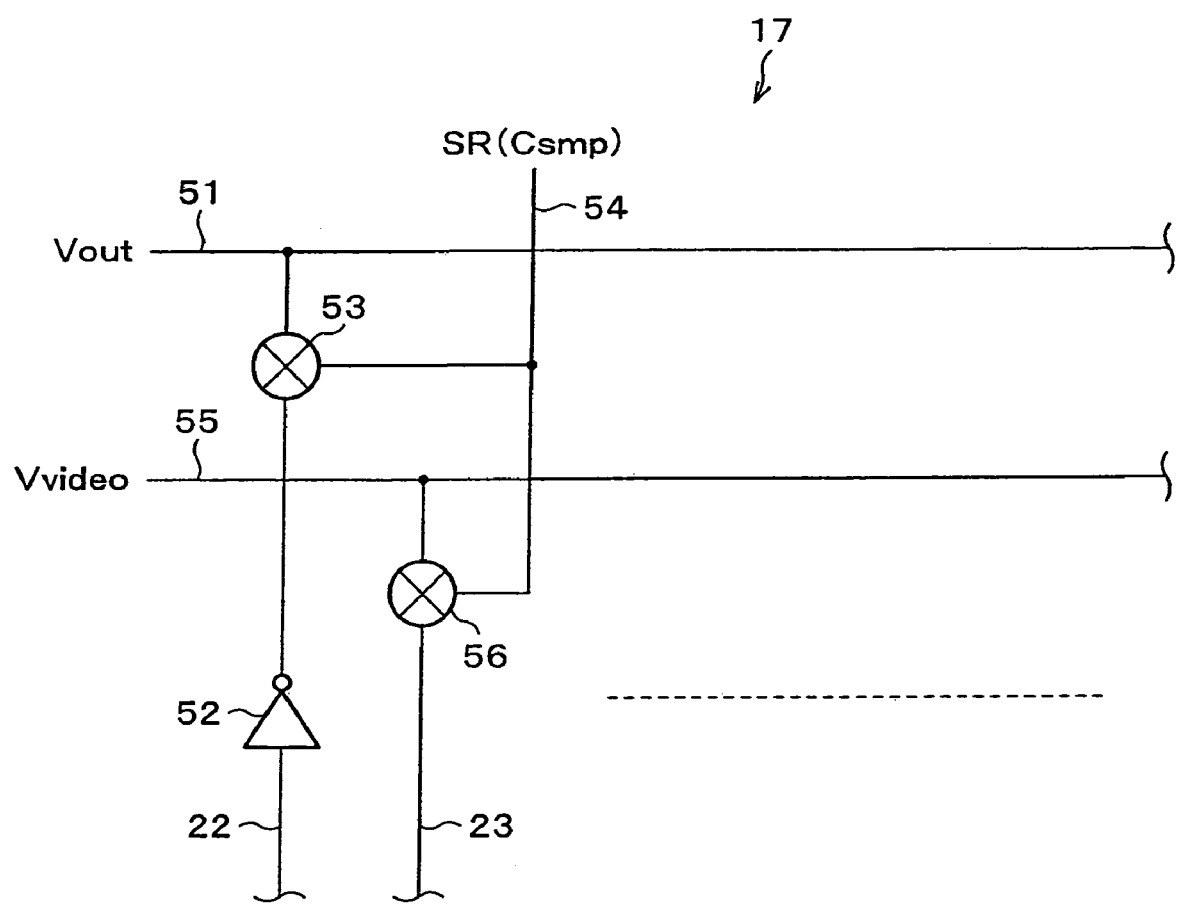
FIG. 4 is a circuit diagram schematically showing an arrangement of a reading circuit shown in FIG. 2.

As shown in FIG. 4, the reading circuit 17 provided in the source driver 12 includes an output line 51 connected to one terminal of the sense line 22, a buffer 52 provided on the sense line 22, a switch 53 for ON/OFF operation provided between the buffer 52 and the output line 51 on the sense line 22, and a control line 54 for controlling ON/OFF operation of the switch 53.

Further, in the source driver 12 shown in FIG. 4, the source line 23 is connected to a data signal line 55, a switch 56 for ON/OFF operation is provided on the source line 23. The switch 56 is connected to the control line 54. To the control line 54, a sampling pulse (Csmp) is supplied from a shift register SR (not shown). Therefore, the switches 53 and 56 carry out the same ON/OFF operation at the same timing in accordance with the sampling pulse. In response to the ON operation of the switches 53 and 56, a detection signal taken out from the sensor section 41 and sent to the sense line 22 is outputted to the output line 51, and a data signal (Vvideo) of the data signal line 55 is outputted to the source line 23.

Figure 5:
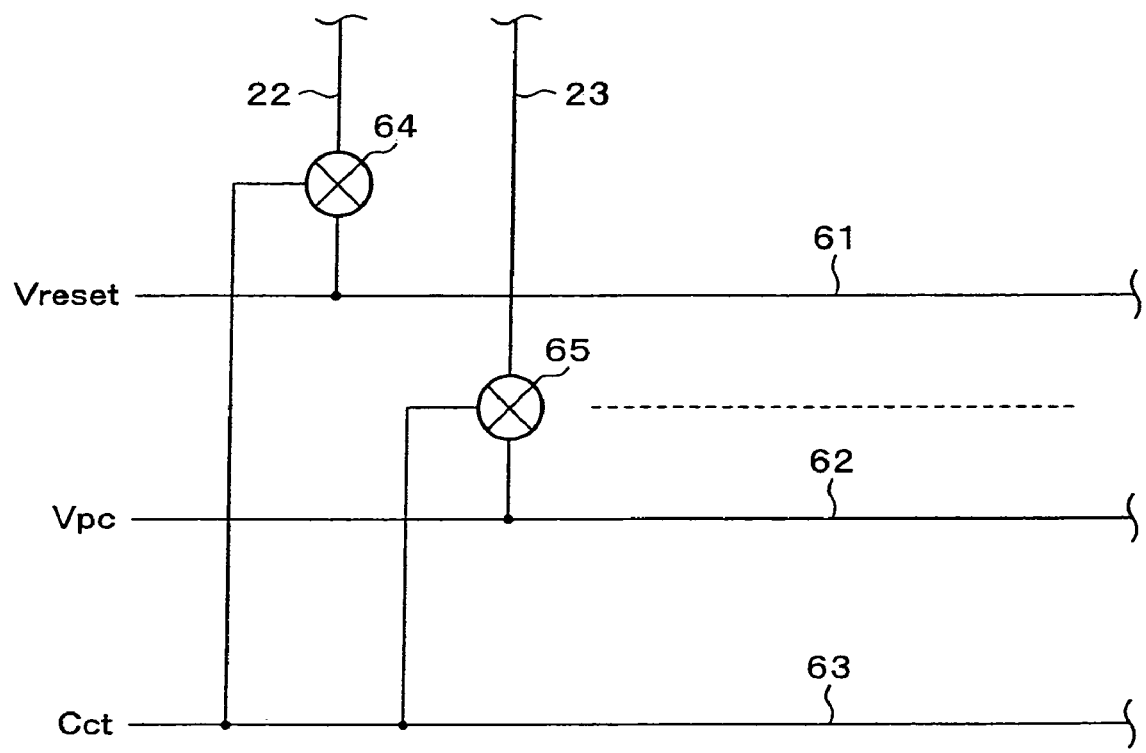
FIG. 5 is a circuit diagram schematically showing an arrangement of a precharge circuit shown in FIG. 2.

As shown in FIG. 5, the precharge circuit 15 shown in FIG. 2 includes a reset line 61, a precharge line 62, a control signal line 63, a switch 64 for ON/OFF operation provided on the sense line 22, a switch 65 for ON/OFF operation provided on the source line 23. The reset line 61 is connected to the sense line 22, the precharge line 62 is connected to the source line 23. The switches 64 and 65 are caused to carry out ON/OFF operation at the same timing by the same control signal (Cct) supplied from the control signal line 63. The precharge circuit 15 is one for carrying out a precharge prior to so-called dot-sequential processing. In the processing, a precharge data signal (Vpc) temporarily held on the precharge line 62 is outputted to the source line 23 simultaneously in response to the ON operation of the switch 65. The sense line 22 is reset by a reset signal (Vreset) supplied from the reset line 61 in response to the ON operation of the switch 64.

Figure 6:
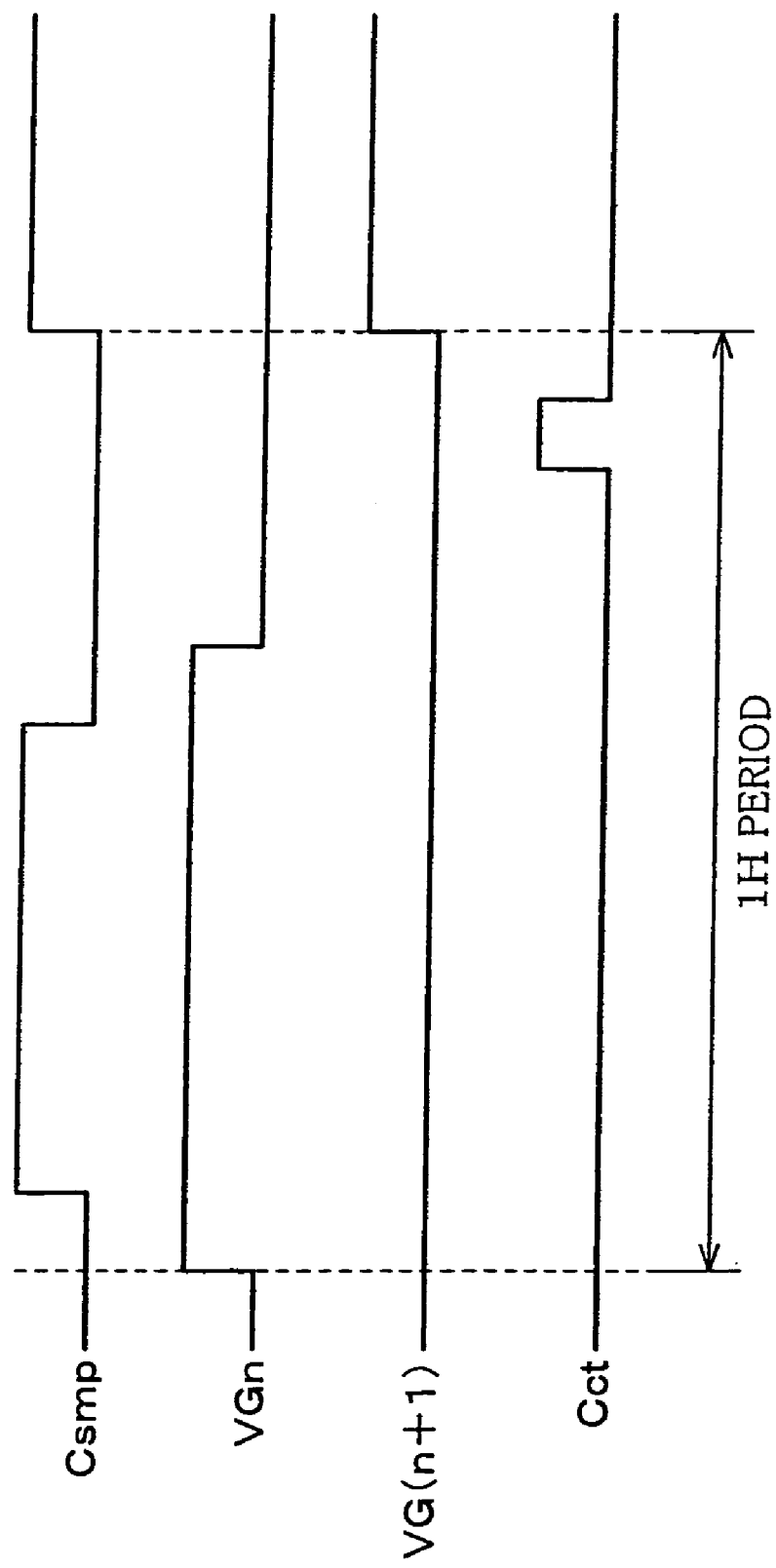
FIG. 6 is a timing chart of main signals in the sensor and display panel part shown in FIG. 1.

In the above arrangement, FIG. 6 shows timings of the sampling pulse (Csmp) outputted from the shift register SR to the switches 53 and 56, scanning signals (VGn, VG(n+1)) outputted from the gate drivers 13 and 14 to the gate line 21 (21n, 21(n+1)), a control signal (Cct) outputted from the control signal line 63 to the switches 64 and 65. The following will describe operations in the input and output device 1.

(Reset Operation of the Holding Capacitance 28)

Each gate line 21 is scanned line-sequentially by the gate drivers 13 and 14. At this point, a TFT-ON-voltage pulse is inputted sequentially to each gate line 21. When the TFT-ON-voltage pulse is inputted to the gate line 21 (n+1), the TFT 27 for reset in the sensor section 41 turns ON. At this point, the gate line 21n has been supplied the TFT-OFF-voltage pulse, and TFT-OFF voltage is written as an initial voltage into the holding capacitance 28.

(Detecting Operation in the Sensor Section 41)

The value of the voltage (VCn) of the CS line 24 is set to that of the TFT-ON voltage or more. Moreover, a holding period of the detection signal in the holding capacitance 28 is a period from when the detection signal is held in the holding capacitance 28 to when the gate line 21 (n+1) is scanned by the TFT-ON-voltage pulse in the reset operation.

In the above holding period, when light is incident to the photo-sensor 29, a holding voltage of the holding capacitance 28 varies. In such a case, since a resistance value of the photo-sensor 29 varies depending on the quantity of light-irradiation, the voltage of the contact point 33 varies in the range from the TFT-OFF voltage which has been already written into the holding capacitance 28 as the initial voltage to the voltage (VCn) of the CS line 24n. Therefore, in the input and output device 1, the voltage (VCn) of the CS line 24n can be varied properly so that the sensitivity of the input and output device 1 to the quantity of light-irradiation can be adjusted.

Note that, multi-level graduation of the detection signal in the input and output device 1 is also possible by setting gradually different voltages to adjacent CS lines 24 (CS line 24n, CS line 24 (n+1)) or by changing the voltage on the CS line 24 for each holding period.

(Reading Operation in the Sensor Section 41)

When the TFT ON voltage pulse is supplied to the gate line 21n by a line-sequential scanning of the gate drivers 13 and 14, the TFT 25 for selecting turns ON. At this point, since the voltage at the contact point 33 is TFT-ON voltage in the sensor section 41 which has been irradiated by light, the TFT 26 turns ON. This makes the sense line 22n to conduct with the CS line 24n, and the voltage of the CS line 24n is written into the sense line 22n.

The operations from the reset operation of the holding capacitance 28 to the reading operation in the sensor section 41 are carried out concurrently with the writing operation into the display section 42 (a pixel for display).

(Reset Operation with Respect to the Sense Line 22)

In the precharge circuit 15 shown in FIG. 5, prior to output of the TFT-ON-voltage pulse from the gate drivers 13 and 14 in the line-sequential scanning, the control signal (Cct) is supplied to the control signal line 63. The sense line 22n is reset at the same time with a precharge of the source line 23n. The reset voltage (Vreset) at this point is TFT-OFF voltage.

(Reading Operation from the Sense Line 22)

In the reading circuit 17 shown in FIG. 4, the sense line 22 and the source line 23 are scanned line-sequentially by the sampling pulse (Csmp) outputted through the control line 54 from the shift register SR. With this, the voltage of the sense line 22, i.e. the detection signal in the sensor section 41 is outputted sequentially to the output line 51, and the voltage of the data signal line 55 is outputted sequentially to the source line 23.

The reset operation to the sense line 22 and the reading operation from the sense line 22 are carried out concurrently with the output operation of the data signal outputted to the source line 23. Repeat of the above operations makes it to simultaneously carry out the display on the display section 42, i.e. the display of a screen, and the detection of light input in the sensor section 41.

As described above, in the input and output device 1, the voltage of the CS line 24 as the detection signal is outputted to the sense line 22 through the TFT 26 and the TFT 25, and the voltage of the CS line 24 is settable to a low voltage, for example, to 5V, if necessary. Even in case of insufficient sensitivity of the photo-sensor 29, the voltage of the CS line 24 can be increased so that the voltage of the contact point 33 becomes 5V, for example. Therefore, the reading circuit 17 of the detection signal is not necessary to withstand a high voltage, so that it is possible to arrange the reading circuit 17 easily and at low cost.

In the input and output device 1, the resistance value of the photo-sensor 29 varies depending on the quantity of light-irradiation. In accordance with the variation of the resistance value, the holding voltage of the holding capacitance 28 varies from the voltage in a Low level of the gate line 21 to the voltage (VCn) of the CS line 24. The voltage held in the holding capacitance 28 causes the TFT 26 for control of holding a vltage to turn ON/OFF. Therefore, the photo-sensor 29 does not require a high optical sensitivity, provided that the photo-sensor 29 can cause the TFT 26 to turn ON/OFF by the voltage change at the both ends of the photo-sensor 29 in the state where the voltage of the CS line 24 is set to a voltage higher than the ON-voltage of the TFT 26. More specifically, it is possible to increase and decrease the optical sensitivity of the apparatus in accordance with the ratio between the ON-voltage and the OFF-voltage in switching the TFT 26, so that the photo-sensor 29 itself does not require a high optical sensitivity. As a result of this, the input and output device 1 can be arranged easily and at low cost.

Figure 17:
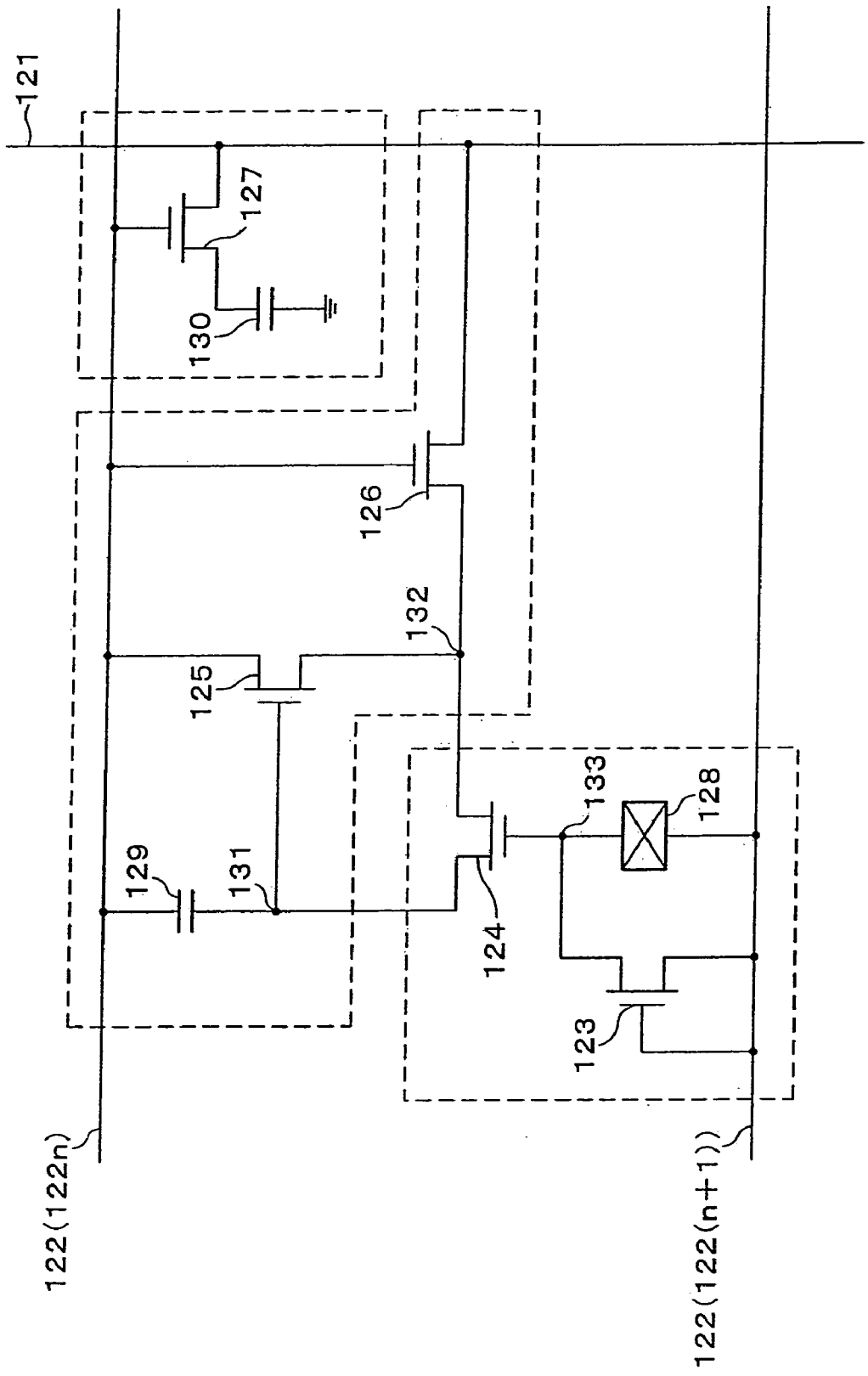
FIG. 17 is a circuit diagram showing an arrangement of the sensor section and the display section in another conventional input and output device.

Further, the arrangement of the previously described conventional document (5) shown in FIG. 17 has a problem that the voltage in High level is written into the pixel when the voltage in High level is read out from the address wire 122 and sent to the data wire 121, so that it is necessary to switch between the reading mode and the display mode. On the contrary, the input and output device 1 has such a highly convenient arrangement that makes it possible to concurrently carry out the display on the display section 42 and the detection of light input in the sensor section 41.

Moreover, in the input and output device 1, the CS line 24 in the display section 42 also serves as a power line of the sensor section 41, so that it is possible to reduce the number of electrode wires in the sensor and display panel part 11, enabling a simplification of the arrangement and increase in open area ratio.

Further, as shown in FIG. 1, in the input and output device 1, the sensor section 41 and the display section 42 share the gate line 21, so that it is possible to reduce the number of electrode wires in the sensor and display panel part 11, enabling a simplification of the arrangement and increase in open area ratio.

Figure 7:
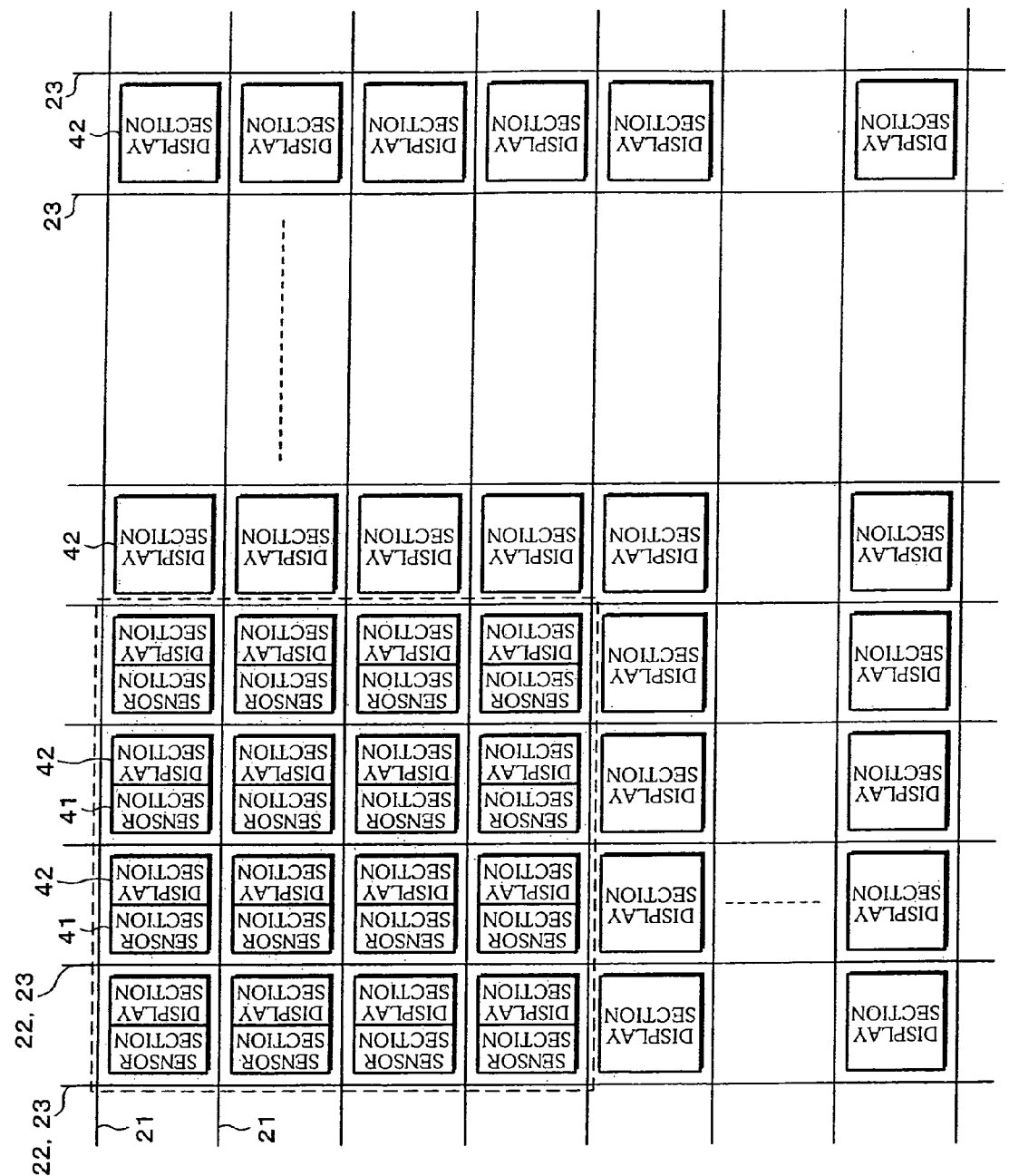
FIG. 7 is an explanatory view showing the case where a sensor and display area having combinations of the sensor section and the display section are provided in a partial or a particular area, and the display sections are provided in the rest of the area in the sensor and display panel part shown in FIG. 2.

Note that, in the above description, the sensor and display panel part 11 is provided with the sensor and display area 43 over substantially the entire surface of the sensor and display panel part 11 as shown in FIG. 3. This arrangement is equivalent to the arrangement in which each of the pixels is provided with the sensor and display area 43. However, the sensor and display panel part 11 is not limited to this. As shown in FIG. 7, the sensor and display panel part 11 may adopt an arrangement in which the sensor and display panel part 11 has the sensor and display area 43, for example, in a partial or a particular area and has the display sections 42 in the rest of the area. In such an arrangement, the sense line 22 and the source line 23 may be provided in the row direction in the area where the sensor and display areas 43 are arranged in the row direction (in the direction of the source line 23). Also, only the source line 23 may be provided in the row direction in the area where only the display sections 42 are arranged in the row direction.

Figure 8:
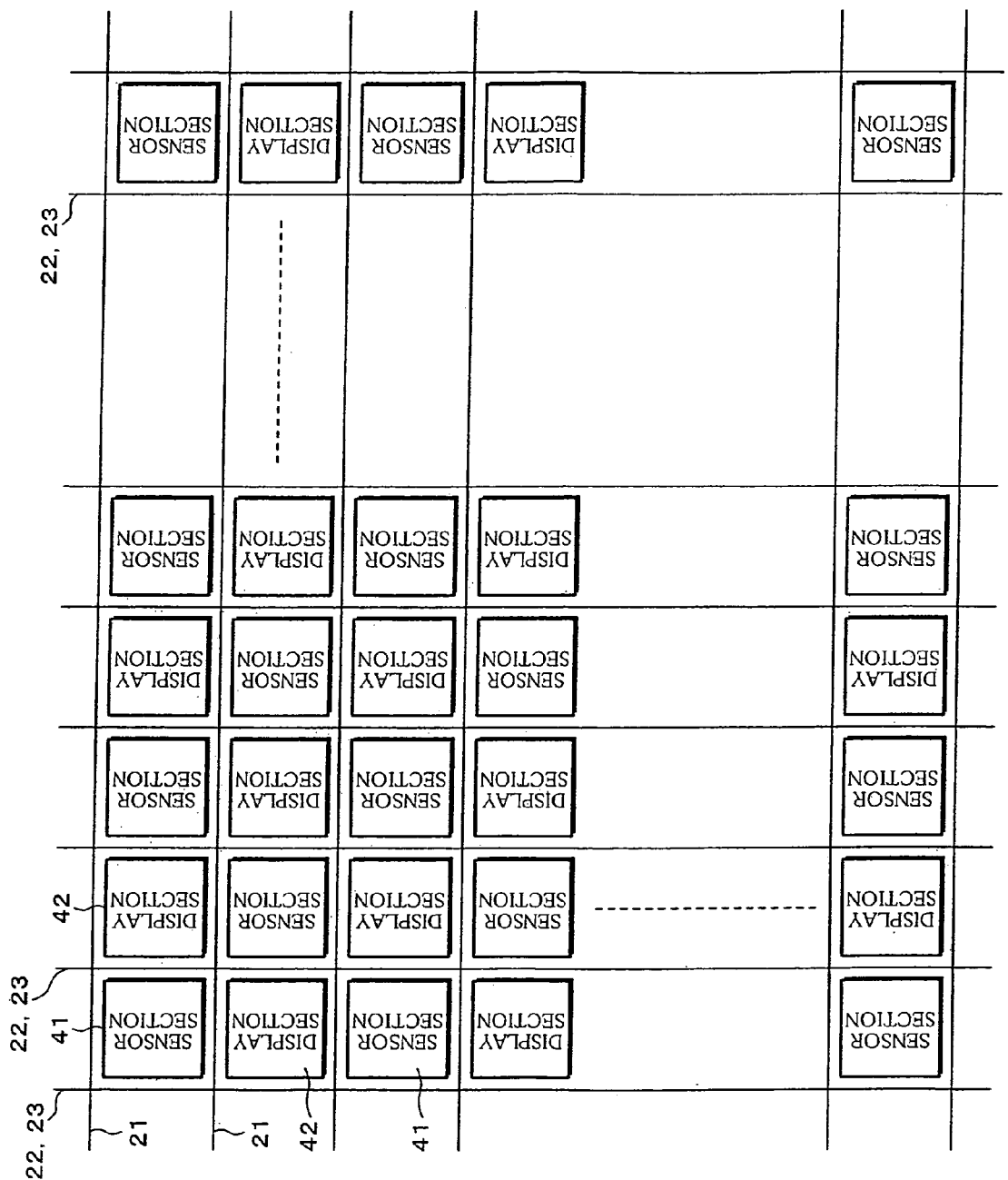
FIG. 8 is an explanatory view showing the case where the sensor section and the display section are provided alternately at least one by one in columns and rows in the sensor and display panel part shown in FIG. 2.

Further, as shown in FIG. 8, the sensor and display panel part 11 may have an arrangement in which the sensor section 41 and the display section 42 are arranged alternately in the column and row directions. The example shows the case where the sensor section 41 is provided, for example, in one pixel out of a plurality of pixels. Further, in FIG. 8, the sensor sections 41 are provided spreading over the substantially entire area of the sensor and display panel part 11.

Figure 9:
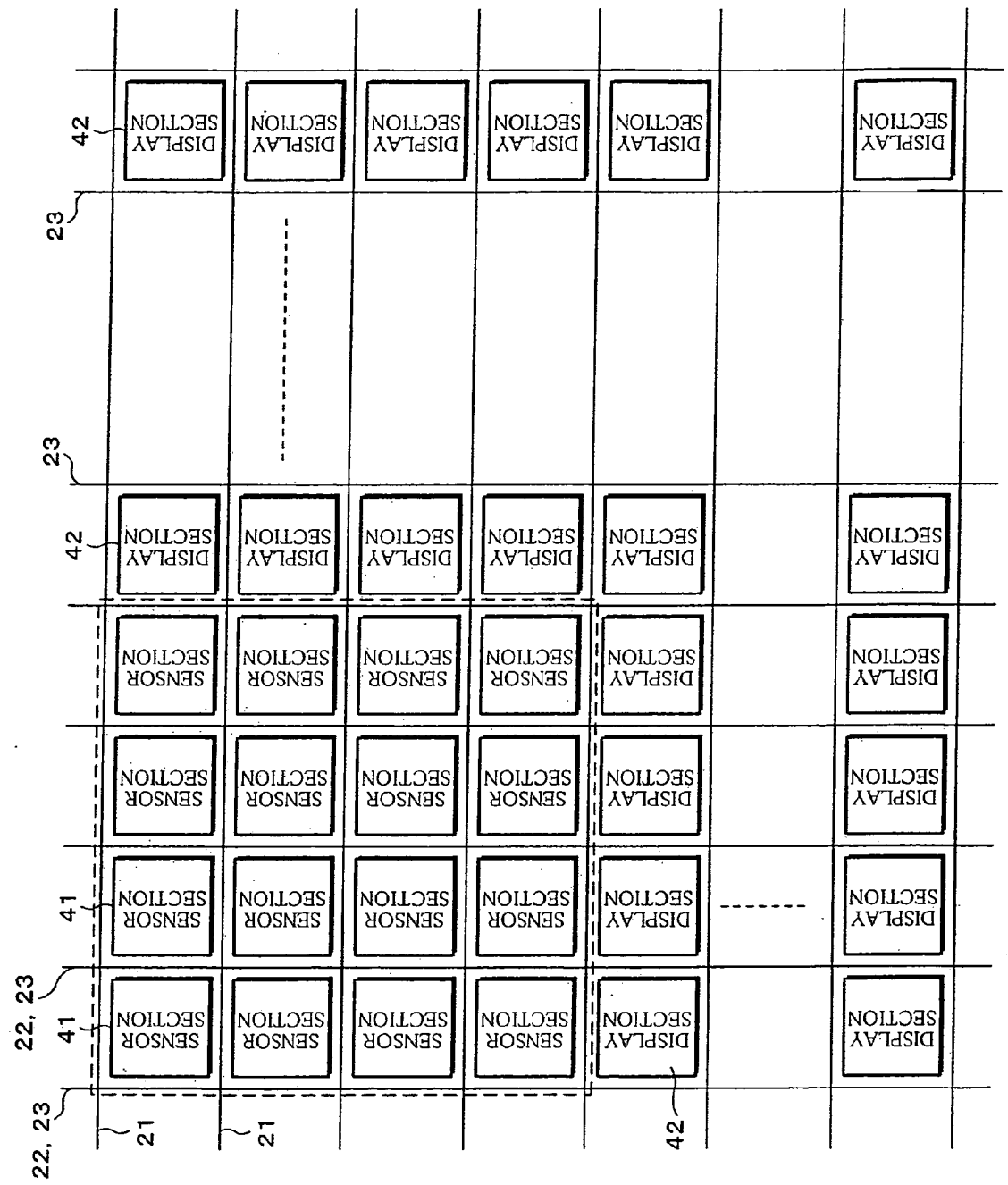
FIG. 9 is an explanatory view showing the case where the sensor sections and the display sections which are provided in respective groups in different areas of the sensor and display panel part shown in FIG. 2.

Still further, as shown in FIG. 9, the sensor and display panel part 11 may have an arrangement in which sensor sections 41 and the display sections 42 are provided in different areas of the sensor and display panel part 11. In FIG. 9, the sensor sections 41 are provided in a part of area (an area at the one corner) of the sensor and display panel part 11, the display sections 42 are provided in the rest of the area. In this example, similarly to the example of FIG. 7, the sense line 22 and the source line 23 may be provided in the row direction in the area where the sensor and display area 43 is arranged in the row direction (in the direction of the source line 23). also, only the source line 23 may be provided in the row direction in the area where only the display sections 42 are arranged in the row direction.

Second Embodiment

Referring to FIGS. 10 through 15, the following will describe another embodiment of the present invention. Note that, means having the same functions as those described in the First Embodiment are given the same reference numerals and explanations thereof are omitted here.

Figure 10:
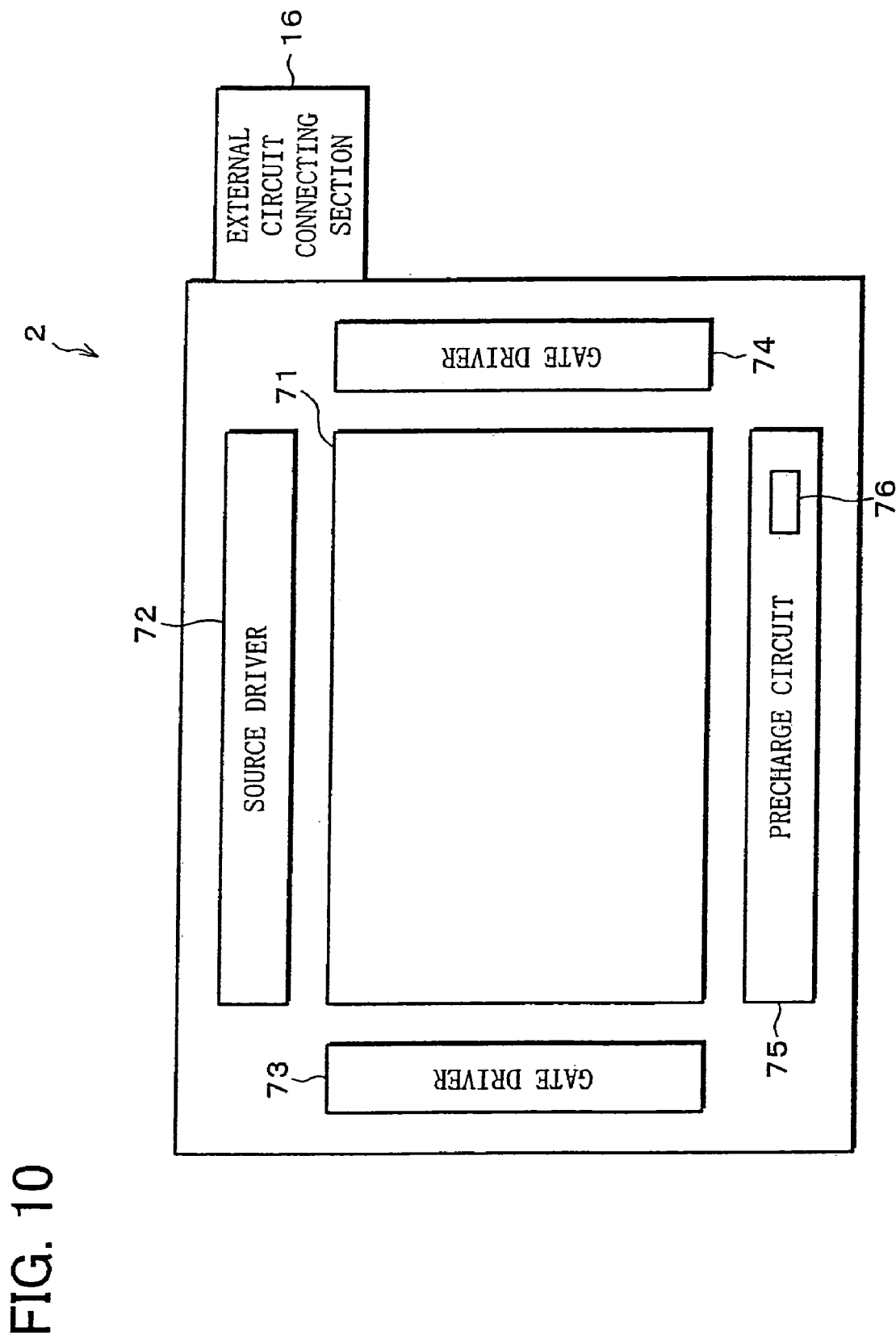
FIG. 10 is a block diagram schematically showing a whole arrangement of the input and output device in another embodiment of the present invention.

The input and output device (input device) 2 of the present embodiment, as shown in FIG. 10, includes a sensor and display panel part 71, a source driver (data signal supply circuit) 72, gate drivers (scanning line drive circuits) 73 and 74, a precharge circuit 75, and an external circuit connecting section 16. In the present embodiment, the reading circuit 76 is provided in the precharge circuit 75, not in the source driver 72. Note that, the gate drivers 73 and 74 may be a single component which is provided only at one side of the sensor and display panel part 71, similarly to the previous input and output device 1. Further, the source driver 72 and the precharge circuit 75 are provided independently from each other; however, it may be arranged in such a manner that these components are made from a single driver, for example, the source driver 72 includes the precharge circuit 75.

Figure 11:
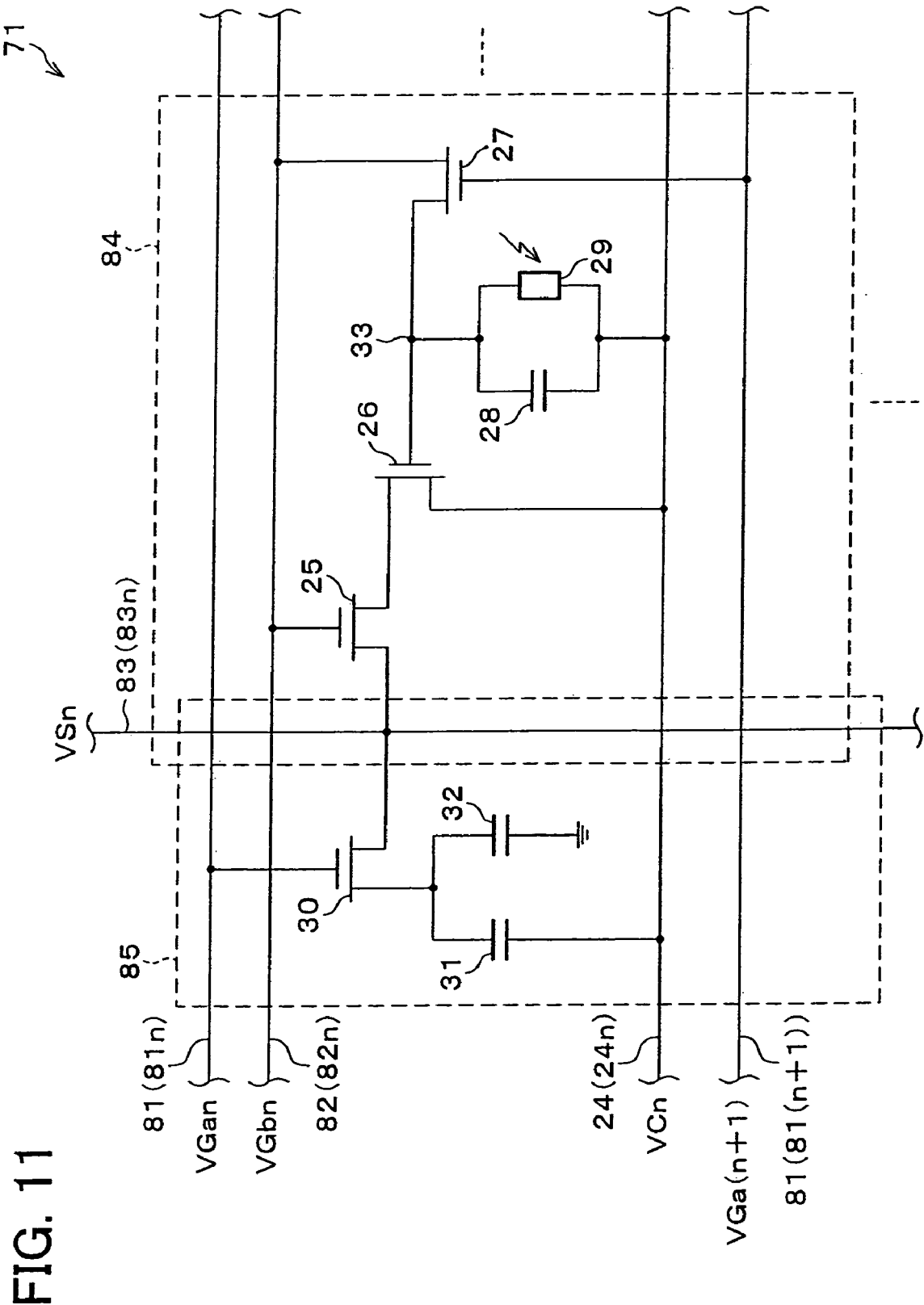
FIG. 11 is a circuit diagram showing an arrangement of a sensor section and a display section which are provided in the input and output device shown in FIG. 10.

The sensor and display panel part 71 includes the circuit configuration shown in FIG. 11. Note that, FIG. 11 shows an arrangement of a sensor section 84 and a display section 85 in combination. As shown in FIG. 11, the sensor and display panel part 71 is provided with a plurality of gate lines (first scanning lines) 81 for writing and a plurality of sense and source lines (output lines) 83 in a matrix manner, and is provided with gate lines (second scanning lines) 82 for reading in the same direction as the gate lines 81 for writing. Further, CS lines 24 are provided in the same direction as the gate lines 81 for writing and the gate lines 82 for reading. The sense and source line 83 serves as both a sense line and a source line.

The sensor section 84 is provided on one side with respect to the sense and source line 83 in the vicinity of intersection of the gate line 81 for writing, the gate line 82 for reading, and the sense and source line 83, and the display section 85 is provided on the other side. In the sensor and display panel part 71, the sensor section 84 and the display section 85 may be provided in any arrangements, for example, shown in FIGS. 7 through 9, similarly to the sensor section 41 and the display section 42 described previously.

The sensor section 84 includes TFTs 25 to 27, a holding capacitance 28, and a photo-sensor 29. The TFT 25 is a switching element for selecting in the sensor section 84, the TFT 26 is a switching element for control of holding a voltage in the holding capacitance 28, and the TFT 27 is a switching element for reset of the holding capacitance 28. The display section 85 includes a TFT 30, an auxiliary capacitance 31, and a liquid crystal 32. The TFT 30 is used for selecting display pixel.

The gate line 81 for writing and the gate line 82 for reading are connected to either the gate driver 73 or 74, the sense and source line 83 is connected to the reading circuit 76 provided in the precharge circuit 75 and the source driver 72.

In the sensor section 84, with respect to the TFT 25, a gate terminal is connected to the gate line 82 (82n) for reading, one of a source terminal and a drain terminal is connected to the sense and source line 83 (83n), and the other is connected to a drain terminal of the TFT 26. With respect to the TFT 26, a gate terminal is connected to one terminal of the holding capacitance 28 and the photo-sensor 29, and a source terminal is connected to the CS line 24 (24n). The holding capacitance 28 and the photo-sensor 29 are connected in parallel, and the other terminal of the holding capacitance 28 and the photo-sensor 29 is connected to the CS line 24. With respect to the TFT 27, a gate terminal is connected to the gate line 81 (81(n+1)) for writing in the subsequent stage, a drain terminal is one terminal of the holding capacitance 28 and the photo-sensor 29, and a source terminal is connected to the gate line 82 (82n) for reading. More specifically, the gate line 81 for writing serves as gate lines of both the TFT 30 for selecting display pixel in the display section 85 and the TFT 27 for reset of the holding capacitance 28 in the sensor section 84 on the preceding stage in the direction of the sense and source line 83.

In the display section 85, with respect to the TFT 30, a gate terminal is connected to the gate line 81 (81n) for writing, a drain terminal is connected to one terminal of the auxiliary capacitance 31 and the liquid crystal 32, and a source terminal is connected to the sense and source line 83 (83n). The other terminal of the auxiliary capacitance 31 is connected to the CS line 24, and the liquid crystal 32 is connected to common electrode (not shown). Therefore, the input and output device 2 is arranged similarly to the input and output device 1 in that the CS line 24 is used for both the display section 85 and the sensor section 84.

Figure 12:
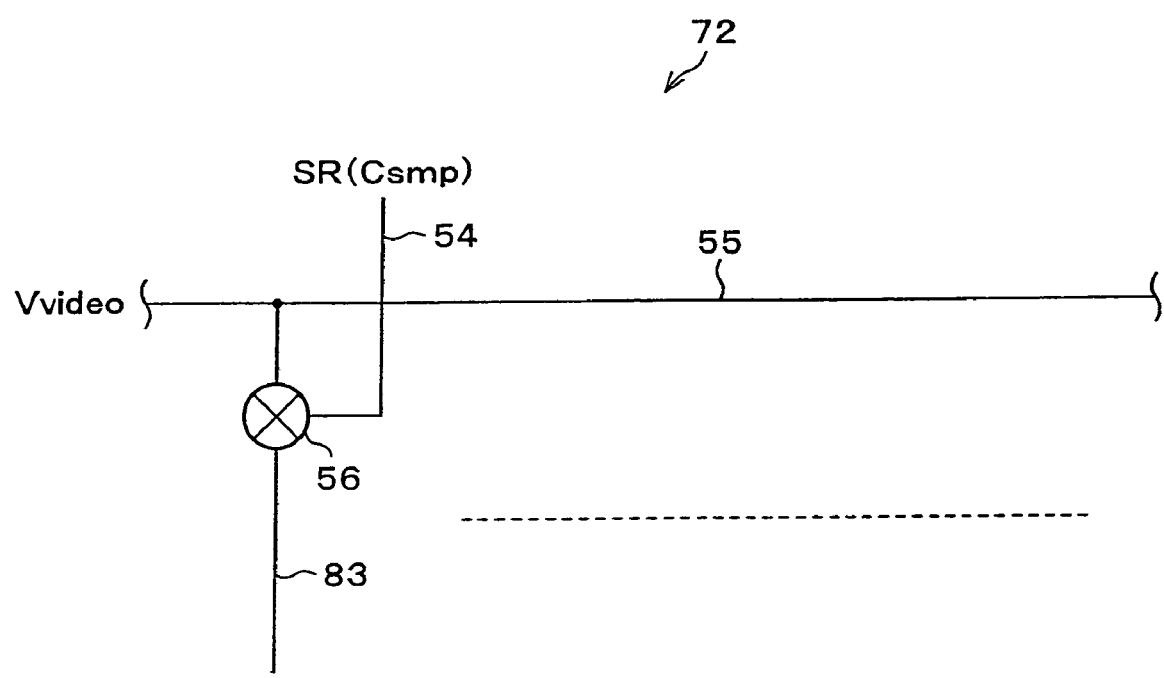
FIG. 12 is a circuit diagram schematically showing an arrangement of a source driver which is provided in the input and output device shown in FIG. 10.

As shown in FIG. 12, one end of the sense and source line 83 is connected to a data signal line 55 in the source driver 72, and a switch 56 for ON/OFF operation is provided on the sense and source line 83. The switch 56 is connected to the control line 54. To the control line 54, a sampling pulse (Csmp) is supplied from a shift register SR. Therefore, the switch 56 carries out the ON/OFF operation in accordance with the sampling pulse. In response to the ON operation of the switch 56, a data signal (Vvideo) of the data signal line 55 is outputted to the sense and source line 83.

Figure 13:
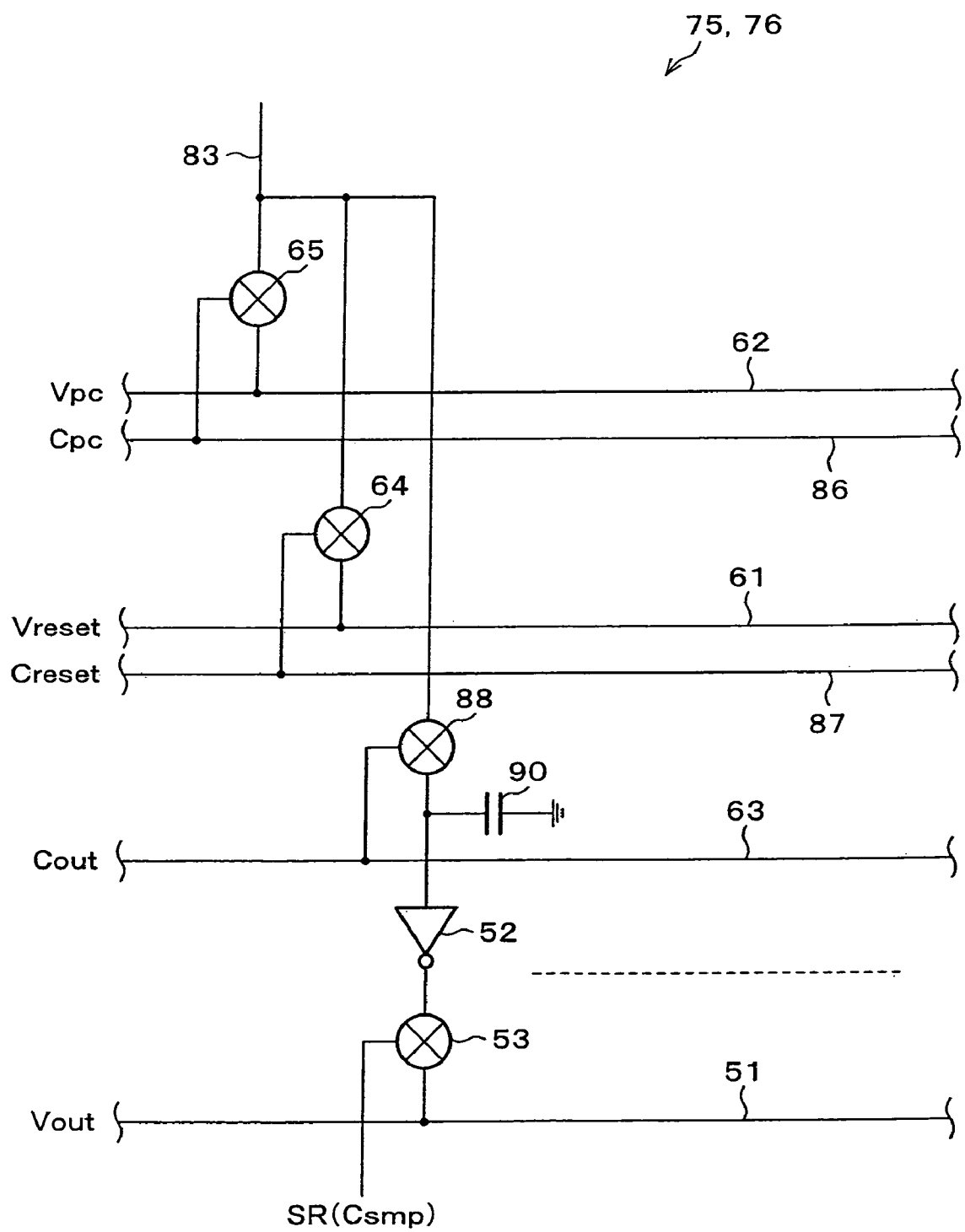
FIG. 13 is a circuit diagram schematically showing an arrangement of a precharge circuit and a reading circuit which are provided in the input and output device shown in FIG. 10.

As shown in FIG. 13, a precharge circuit 75 and a reading circuit 76 include a precharge line 62, a precharge control line 86, a reset line 61, a reset control line 87, a control signal line 63, and an output line 51. The precharge line 62 and the reset line 61 are connected to the sense and source line 83 via a switch 65 and a switch 64, respectively. Also, the output line 51 is connected to the sense and source line 83 via a switch 88 for output memory, a buffer 52, and a switch 53. Moreover, between the switch 88 and the buffer 52 connected is one terminal of a memory capacitance 90. The switch 65 subjects its ON/OFF operation to the control by the control signal supplied from the precharge control line 86, i.e. a precharge pulse (Cpc). The switch 64 subjects its ON/OFF operation to the control by the control signal supplied from the reset control line 87, i.e. a reset pulse (Creset). The switch 88 subjects its ON/OFF operation to the control by the control signal supplied from the control signal line 63, i.e. a memory pulse (Cout). The switch 53 subjects its ON/OFF operation to the control by the sampling pulse (Csmp) supplied from the shift resistor SR.

Note that, in the circuit of FIG. 13, the precharge circuit 75 is composed of the precharge line 62, the precharge control line 86, the reset line 61, the reset control line 87, the switch 65, and the switch 64. The reading circuit 76 is composed of the control signal line 63, the output line 51, the switch 88, the memory capacitance 90, the buffer 52, and the switch 53.

Further, the shift register SR can be shared for both control of the switch 56 shown in FIG. 12, i.e. writing to the display section 85 and control of the switch 53 shown in FIG. 13, i.e. reading of the detection signal supplied from the sense and source line 83.

Figure 14:
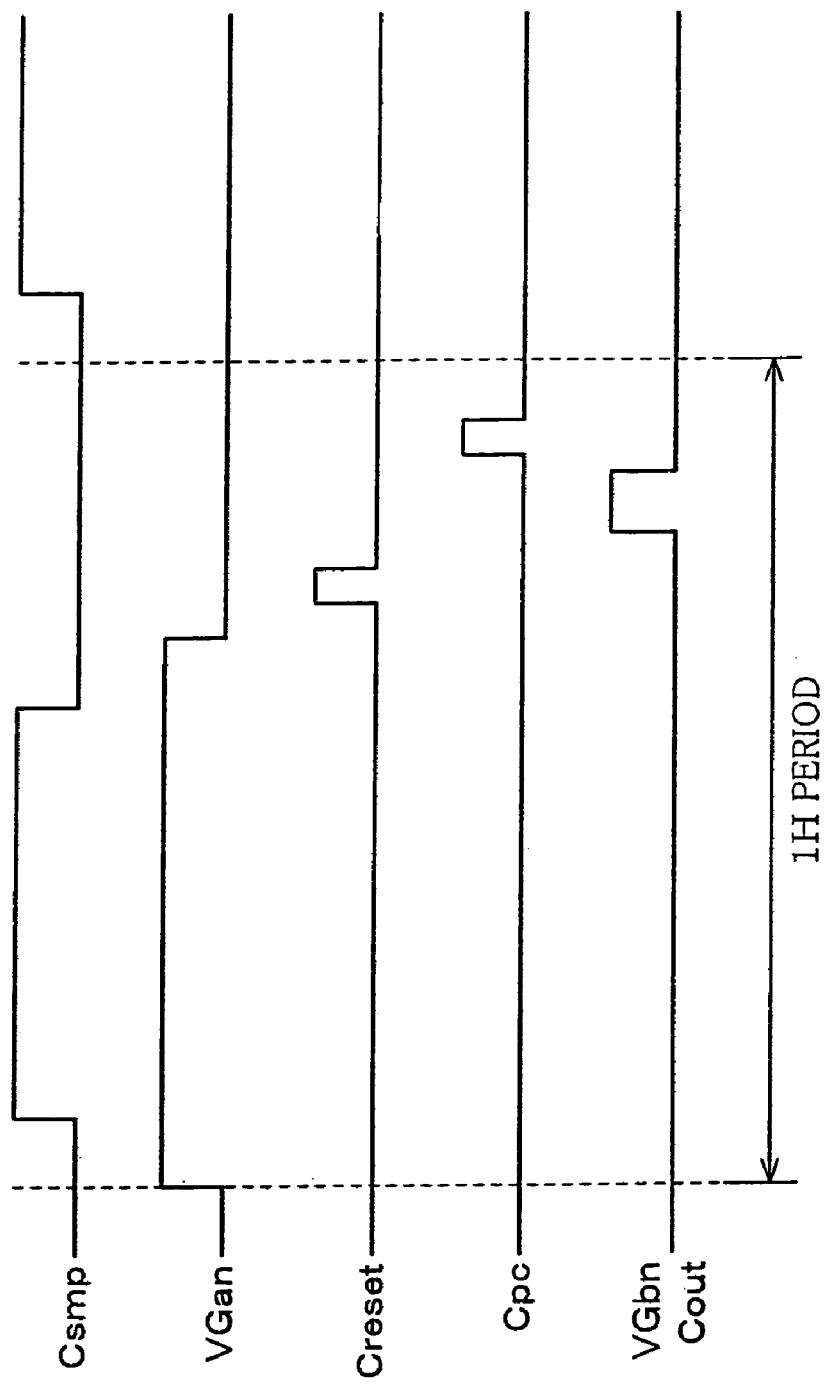
FIG. 14 is a timing chart of main signals in the sensor and display panel part shown in FIG. 11.

In the above arrangement, in the input and output device 2, FIG. 14 shows timings of the sampling pulse (Csmp) outputted from the shift register SR to the switches 53 and 56, a scanning signal (VGan) outputted from the gate drivers 73 and 74 to the gate line 81 for writing, a control signal (Creset) outputted from the reset control line 87 to the switch 64, a control signal (Cpc) outputted from the precharge control line 86 to the switch 65, a scanning signal (VGbn) outputted from the gate drivers 73 and 74 to the gate line 82 for reading, and a control signal (Cout) outputted from the control signal line 63 to the switch 88. The following will describe operations in the input and output device 2.

(Reset Operation of the Holding Capacitance 28)

Each gate line 81 for writing is scanned line-sequentially by the gate drivers 73 and 74. At this point, a TFT-ON-voltage pulse is inputted sequentially to each gate line 81 for writing. When the TFT-ON-voltage pulse is inputted to the gate line 81 (n+1) for writing, the TFT 27 for reset in the sensor section 84 turns ON. At this point, the gate line 82n for reading has been supplied the TFT-OFF-voltage pulse, and the TFT-OFF voltage is written as an initial voltage into the holding capacitance 28.

(Detecting Operation in the Sensor Section 84)

The value of the voltage (VCn) of the CS line 24 is set to that of TFT-ON voltage or more. Moreover, a holding period of the detection signal in the holding capacitance 28 is a period from when the detection signal is held in the holding capacitance 28 to when the gate line 81 (n+1) for writing is scanned by the TFT-ON-voltage pulse in the reset operation.

In the above holding period, when light is incident to the photo-sensor 29, a holding voltage of the holding capacitance 28 varies. In such a case, since a resistance value of the photo-sensor 29 varies depending on the quantity of light-irradiation, the voltage of the contact point 33 varies in the range from the TFT-OFF voltage which has been already written into the holding capacitance 28 as the initial voltage to the voltage (VCn) of the CS line 24n. Therefore, in the input and output device 2, similarly to the input and output device 1, the voltage (VCn) of the CS line 24n can be varied properly so that the sensitivity of the input and output device 2 to the quantity of light-irradiation can be adjusted.

Note that, similarly to the input and output device 1, multi-level graduation of the detection signal in the input and output device 2 is also possible by setting gradually different voltages to adjacent CS lines 24 (CS line 24n, CS line 24 (n+1)) or by changing the voltage on the CS line 24 for each holding period.

(Reading Operation in the Sensor Section 84)

When the TFT-ON-voltage pulse is supplied to the gate line 82 for reading by a line-sequential scanning of the gate drivers 73 and 74 for each 1H retrace time, the TFT 25 for selecting turns ON. At this point, since the voltage at the contact point 33 is TFT-ON voltage in the sensor section 84 which has been irradiated by light, the TFT 26 turns ON. This makes the sense and source line 83(83n) to conduct with the CS line 24(24n), and the voltage of the CS line 24(24n) is written into the sense and source line 83(83n).

(Reset and Reading Operations to the Sense and Source Line 83)

The basic operation here is the following operations (1)→(2)→(3) in the period of 1H retrace time, and the operation (4):

(1) Reset operation of the sense and source line 83;

(2) Reading circuit 76's memory operation of the detection signal outputted to the sense and source line 83;

(3) Precharge operation of the data signal (Vvideo) outputted to the sense and source line 83; and (4) Output operation of the detection signal memorized in the operation (2) to the output line 51 in the period of 1H scanning time.

(1) Reset Operation of the Sense and Source Line 83

In the circuit shown in FIG. 13, in response to the supply of the reset pulse (Creset) from the reset control line 87, the switch 64 for reset turns ON. The reset voltage (Vreset) is applied to the sense and source line 83. At this point, the reset voltage (Vreset) is TFT-OFF voltage.

(2) Reading Circuit 76's Memory Operation of the Detection Signal Outputted to the Sense and Source Line 83

In the circuit shown in FIG. 13, in response to the supply of the memory pulse (Cout) from the control signal line 63, the switch 88 for output and reset turns ON, and at the same time, the TFT ON voltage pulse is supplied to the gate line 82 for reading. At this point, the memory capacitance 90 of the sense and source line 83, connected to the sensor section 84 which has the TFT 26 being in the ON state by subjecting to light-irradiation, is connected to the CS line 24 via the TFTs 25 and 26. This makes it possible to write the detection signal in the sensor section 84, i.e. the voltage of the CS line 24 in the memory capacitance 90.

(3) Precharge Operation of the Data Signal (Vvideo) Outputted to the Sense and Source Line 83

In the circuit shown in FIG. 13, in response to the supply of the precharge pulse (Cpc) from the precharge control line 86, the switch 65 for precharge turns ON. This makes the precharge line 62 to apply the precharge voltage (Vpc) to the sense and source line 83.

(4) Output Operation of the Detection Signal to the Output Line 51 in the Period of 1H Scanning Time.

In the source driver 72 shown in FIG. 12, the switch 56, i.e. the sense and source line 83 is scanned by the sampling pulse (Csmp). Similarly to this, in the circuit shown in FIG. 13, the switch 53, i.e. the sense and source line 83 is scanned line-sequentially by the sampling pulse (Csmp). With this, in the source driver 72, signals of the data signal lines 55 are outputted sequentially to the respective sense and source line 83. Moreover, in the reading circuit 76, the detection signal that has been held in the memory capacitances 90 are outputted sequentially to the respect output lines 51. Thus, the output operation of the detection signal to the output line 51 is carried out concurrently with the input operation of the data signal (Vvideo) to the sense and source line 83 for display.

Repeat of the above operations makes it to carry out the detection operation in the sensor section 84 concurrently with the display operation in the display section 85, that is the display of screen.

Note that, the input and output device 2 is similar to the input and output device 2 in (a) that the reading circuit 76 is not necessary to withstand a high voltage, so that it is possible to arrange the reading circuit 76 easily and at low cost, (b) that the photo-sensor 29 does not require a high optical sensitivity, so that the input and output device 2 can be arranged easily and at low cost, (c) that the display on the display section 85 and the detection of light input in the sensor section 84 are concurrently carry out, so that the input and output device 2 has a highly convenient arrangement, and (d) that the CS line 24 in the display section 85 also serves as a power line of the sensor section 84, so that it is possible to reduce the number of electrode wires in the sensor and display panel part 71, enabling a simplification of the arrangement and increase in open area ratio.

Further, as shown in FIG. 11, in the input and output device 2, the sense and source line 83 is used as both the sense line of the sensor section 84 and the source line of the display section 85, so that it is possible to reduce the number of electrode wires in the sensor and display panel part 71, enabling a simplification of the arrangement and increase in open area ratio.

Figure 15:
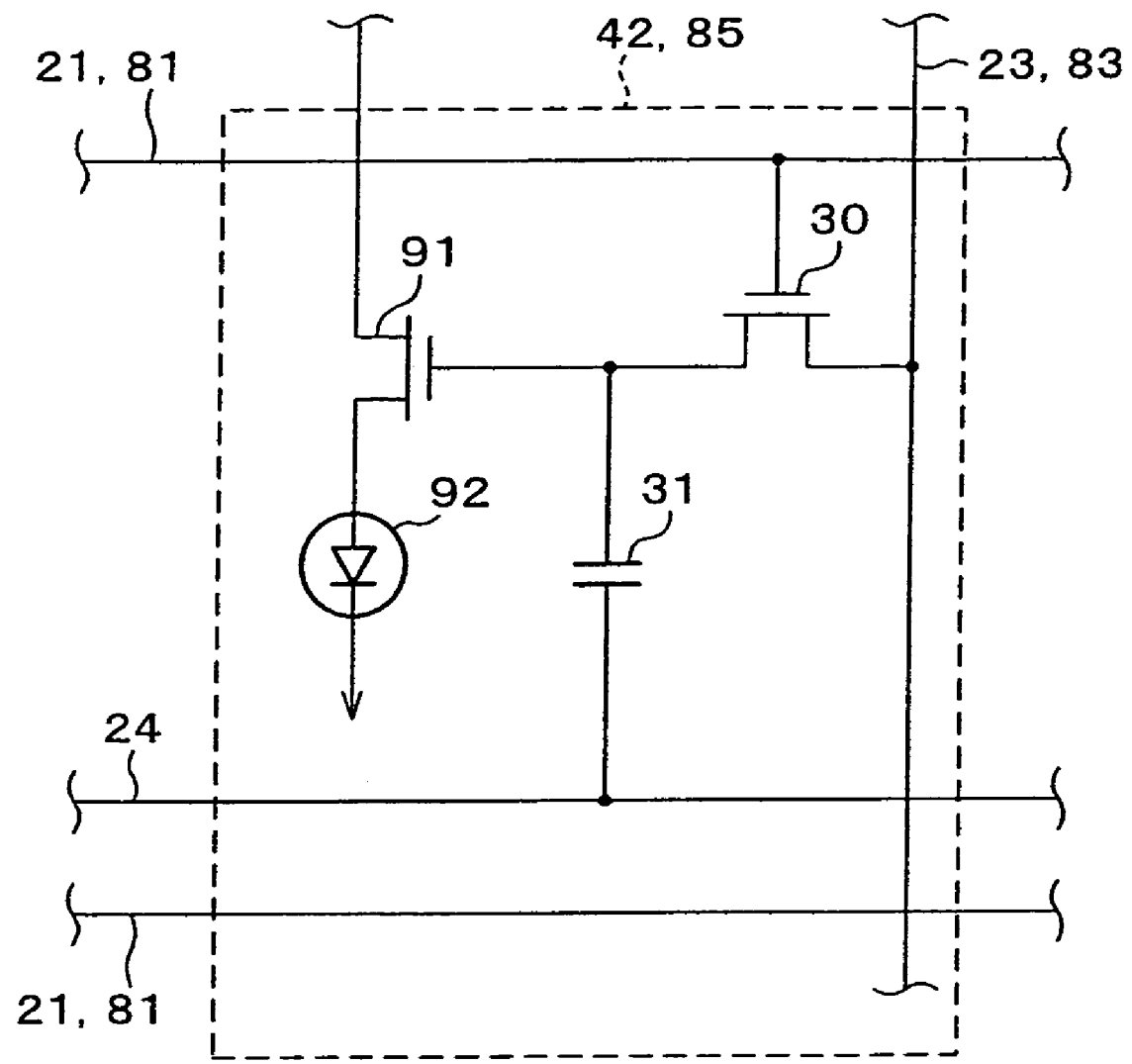
FIG. 15 is a circuit diagram showing an arrangement of the display section shown in FIGS. 1 and 11, which is provided with an organic EL device, instead of a liquid crystal, as an electro-optic device.
Figure 16:
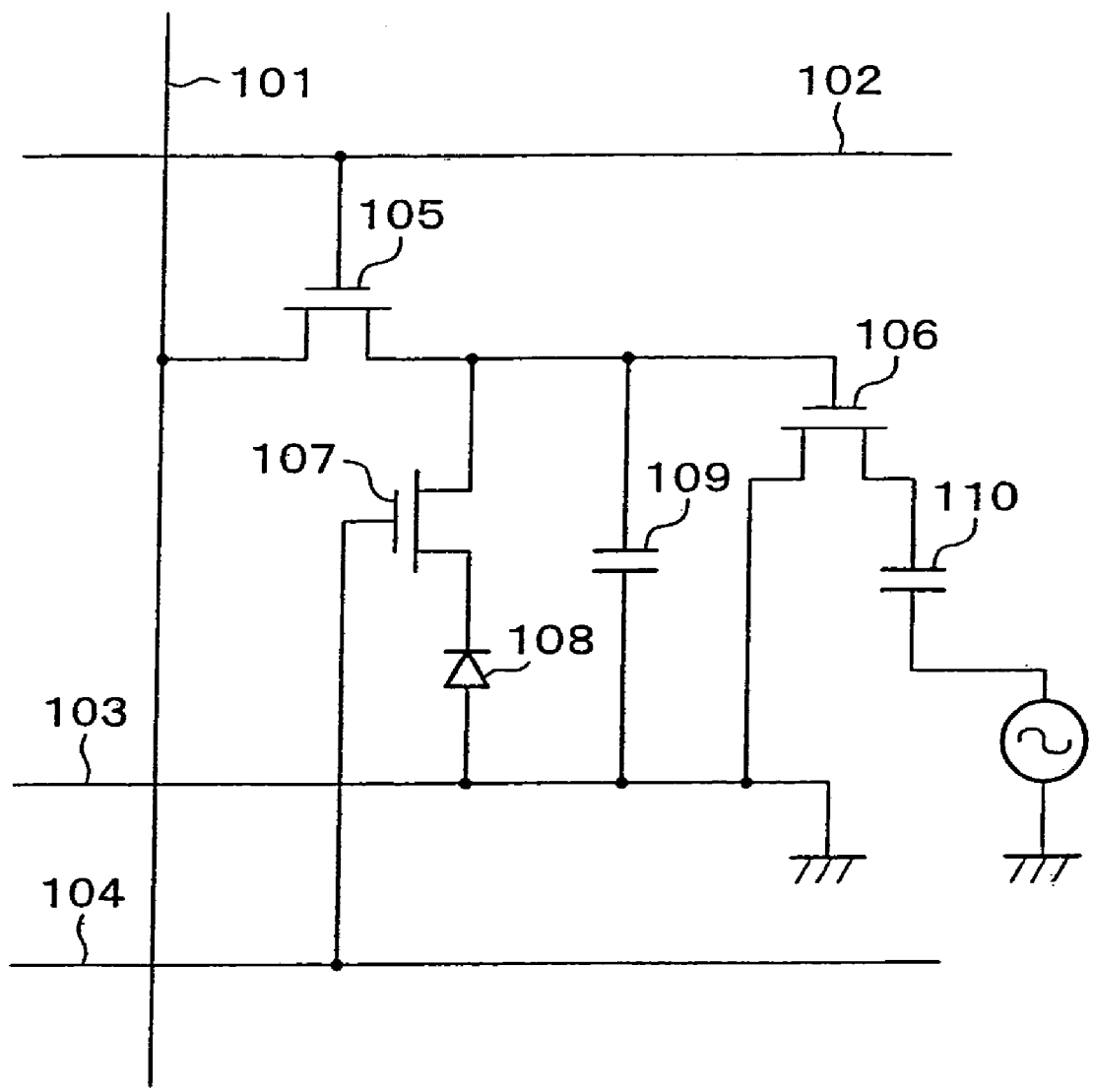
FIG. 16 is a circuit diagram showing an arrangement of the sensor section and the display section in the conventional input and output device.

Still further, in the above embodiments, the input and output devices 1 and 2 are provided with the liquid crystal 32 as an electro-optical device for display on the display section 42 and 85, respectively. However, the present invention is not limited to this. For example, the electro-optical device may be an organic EL (Electroluminescence) device. In such a case, the arrangement of the display sections 42 and 85 shown in FIGS. 1 and 11, respectively, is defined to include, for example, a TFT 91 and an organic EL device 92 instead of the liquid crystal 32, as shown in FIG. 15.

Yet further, in the above embodiments, the present invention is described that the input and output devices 1 and 2 are provided with the sensor section 41 and the display section 42, and the sensor section 84 and the display section 85, respectively. However, the present invention is applicable for input devices having only the sensor sections 41 and 84 without the display sections 42 and 85, respectively.

As described above, the present invention relates to a structure and a driving method for incorporating, for example, the function as a pen input device into an LCD, and the present invention makes it possible to incorporate periphery circuits into a panel because of being highly sensitive to a light supply and being practicable with simply-arranged periphery circuits.

As described above, an input device of the present invention, includes:

a plurality of output lines;

a plurality of output voltage supply lines to which an output voltage is applied;

a first active element having a first control terminal, a first terminal connected to the output line, and a second terminal connected to the output voltage supply line, the first control terminal being supplied an input signal so that a conductivity between the first and second terminals is controlled;

a photo-sensor having a first terminal which is connected to the first control terminal of the first active element; and an electrostatic capacitance, connected in parallel to the photo-sensor, having a terminal on an opposite side of the first control terminal, to which a holding voltage is supplied.

According to the above arrangement, the voltage of the output voltage supply line is settable to an appropriately low voltage, so that the reading circuit of the detection signal supplied from the output line does not need to withstand a high voltage.

Further, any photo-sensor may be adopted, provided it can vary the holding voltage of the electrostatic capacitance with its voltage produced to control the conductivity (conduction/non-conduction) of the active element, and the photo-sensor itself does not require a high optical sensitivity. Therefore, it is possible to arrange the input device easily and at low cost.

It may be arranged so that the input device further includes:

a plurality of scanning lines including first and second scanning lines;

a second active element, provided between the first active element and the output line, having a second control terminal connected to the first scanning line, a first terminal connected to the output line, a second terminal connected to the first terminal of the first active element, the second control terminal being supplied an input signal so that a conductivity between the first and second terminals of the second active element is controlled; and a third active element having a third control terminal connected to a second scanning line adjacent to the first scanning line, a first terminal connected to the first scanning line, and a second terminal connected to the first control terminal of the first active element, the third control terminal being supplied an input signal so that a conductivity between the first and second terminals of the third active element is controlled, the output lines and the scanning lines being provided in a matrix manner.

According to the above arrangement, the electrostatic capacitance is reset by the scanning signal in scanning each scanning line sequentially, so that it is possible to perform an accurate detection operation.

It may be arranged so that the input device further includes:

plural combinations of first and second scanning lines;

a second active element, provided between the first active element and the output line, having a second control terminal connected to a second scanning line in a first combination, a first terminal connected to the output line, a second terminal connected to the first terminal of the first active element, the second control terminal being supplied an input signal so that a conductivity between the first and second terminals of the second active element is controlled; and a third active element having a third control terminal connected to a first scanning line in a second combination adjacent to the first combination, a first terminal connected to the second scanning line in the first combination, and a second terminal connected to the first control terminal of the first active element, the third control terminal being supplied an input signal so that a conductivity between the first and second terminals of the third active element is controlled, the output lines and the combinations of the first and second scanning lines being provided in a matrix manner.

According to the above arrangement, the electrostatic capacitance is reset by the scanning signal in scanning each scanning line sequentially, so that it is possible to perform an accurate detection operation.

In the above input device, the photo-sensor may have a second terminal connected to the output voltage supply line.

According to the above arrangement, the holding voltage of the electrostatic capacitance is supplied from the output voltage supply line, so that it is possible to easily adjust a sensitivity of the input device by properly setting the voltage applied to the output voltage supply line. Further, it is possible to share the voltage applied to the output voltage supply line for the holding voltage of the electrostatic capacitance and the detection signal outputted to the output line.

It may be arranged so that the input device further includes a scanning line drive circuit which outputs a conducting signal for causing the second and third active elements to conduct so as to sequentially scan the scanning lines.

According to the above arrangement, it is possible to properly output the detection signal by each photo-sensor sequentially by scanning of the scanning line drive circuit.

An input and output device of the present invention, includes:

a plurality of sensor sections; and a plurality of display sections using an electro-optic device to display an image, the sensor section including:

(a) a plurality of output lines;

(b) a plurality of output voltage supply lines to which an output voltage is applied;

(c) a first active element having a first control terminal, a first terminal connected to the output line, and a second terminal connected to the output voltage supply line, the first control terminal being supplied an input signal so that a conductivity between the first and second terminals is controlled;

(d) a photo-sensor having a first terminal which is connected to the first control terminal of the first active element; and (e) an electrostatic capacitance, connected in parallel to the photo-sensor, having a terminal on an opposite side of the first control terminal, to which a holding voltage is supplied.

According to the above arrangement, the voltage of the output voltage supply line is settable to an appropriately low voltage, so that the reading circuit of the detection signal supplied from the output line does not need to withstand a high voltage.

Further, any photo-sensor may be adopted, provided it can vary the holding voltage of the electrostatic capacitance with its voltage produced to control the conductivity (conduction/non-conduction) of the active element, and the photo-sensor itself does not require a high optical sensitivity. Therefore, it is possible to arrange the input device easily and at low cost.

The above input and output device may be arranged so that the display section includes an auxiliary capacitance to hold a data signal for displaying on the electro-optic device, the auxiliary capacitance having a first terminal and a second terminal, the data signal is supplied to the first terminal of the auxiliary capacitance, and a predetermined voltage is supplied via a voltage supply line for an auxiliary capacitance to the second terminal of the auxiliary capacitance, the voltage supply line for an auxiliary capacitance serving as the output voltage supply line.

According to the above arrangement, the voltage supply line for the auxiliary capacitance for the display section serves as the output voltage supply line for the sensor section, so that it is possible to reduce the required number of electrode wires, enabling simplification of the arrangement and increase in open area ratio. Further, the voltage supply line for the auxiliary capacitance for the display section is settable to a low voltage if necessary, so that in case where the voltage of the voltage supply line for the auxiliary capacitance is supplied to the output line as the detection signal, the reading circuit of the detection signal does not need to withstand a high voltage.

It may be arranged so that the input and output device further includes:

a plurality of signal lines; and a plurality of scanning lines including first and second scanning lines;

the output lines, the signal lines, and the scanning lines being provided in a matrix manner, the voltage supply line for the auxiliary capacitance being provided in a scanning-line-direction in accordance with the scanning line, wherein:

the sensor section includes a second active element and a third active element, the second active element, provided between the first active element and the output line, having a second control terminal connected to the first scanning line, a first terminal connected to the output line, a second terminal connected to the first terminal of the first active element, the second control terminal being supplied an input signal so that a conductivity between the first and second terminals of the second active element is controlled, the third active element having a third control terminal connected to a second scanning line adjacent to the first scanning line, a first terminal connected to the first scanning line, and a second terminal connected to the first control terminal of the first active element, the third control terminal being supplied an input signal so that a conductivity between the first and second terminals of the third active element is controlled, and the display section includes a fourth active element, the fourth active element having a fourth control terminal connected to the first scanning line, a first terminal connected to the signal line, a second terminal connected to a circuit on a side of the auxiliary capacitance and the electro-optic device, the fourth control terminal being supplied an input signal so that a conductivity between the first and second terminals of the fourth active element is controlled.

According to the above arrangement, the electrostatic capacitance is reset by the scanning signal in scanning each scanning line sequentially, so that it is possible to perform an accurate detection operation. Further, the scanning line is shared in the sensor section and the display section, so that it is possible to reduce the required number of electrode wires, enabling simplification of the arrangement and increase in open area ratio.

It may be arranged so that the input and output device further includes:

plural combinations of first and second scanning lines, the output line in the sensor section serving as a signal line of the display section, the output lines and the plural combinations of first and second scanning lines being provided in a matrix manner, the voltage supply line for the auxiliary capacitance being provided in the scanning-line-direction in accordance with the first and second scanning lines, wherein:

the sensor section include a second active element and a third element, the second active element, provided between the first active element and the output line, having a second control terminal connected to the second scanning line in a first combination, a first terminal connected to the output line, a second terminal connected to the first terminal of the first active element, the second control terminal being supplied an input signal so that a conductivity between the first and second terminals of the second active element is controlled, the third active element having a third control terminal connected to a first scanning line in a second combination adjacent to the first combination, a first terminal connected to the second scanning line in the first combination, and a second terminal connected to the first control terminal of the first active element, the third control terminal being supplied an input signal so that a conductivity between the first and second terminals of the third active element is controlled, and the display section includes a fourth active element, the fourth active element having a fourth control terminal connected to the first scanning line in the first combination, a first terminal connected to the signal line, a second terminal connected to a circuit on a side of the auxiliary capacitance and the electro-optic device, the fourth control terminal being supplied an input signal so that a conductivity between the first and second terminals of the fourth active element is controlled.

According to the above arrangement, the electrostatic capacitance is reset by the scanning signal in scanning each scanning line sequentially, so that it is possible to perform an accurate detection operation. Further, one output line is shared for the output line of the sensor section and the signal line of the display section, so that it is possible to reduce the required number of electrode wires, enabling simplification of the arrangement and increase in open area ratio.

In the input and output device, the photo-sensor may have a second terminal connected to the output voltage supply line.

According to the above arrangement, the holding voltage of the electrostatic capacitance is supplied from the output voltage supply line, so that it is possible to easily adjust a sensitivity of the input device by properly setting the voltage applied to the output voltage supply line. Further, it is possible to share the voltage applied to the output voltage supply line for the holding voltage of the electrostatic capacitance and the detection signal outputted to the output line.

It may be arranged so that the input and output device further includes:

a scanning line drive circuit which outputs a conducting signal for causing the second to fourth active elements to conduct so as to sequentially scan the scanning lines; and a signal line drive circuit which supplies a data signal for display to the signal line.

According to the above arrangement, it is possible to properly output the detection signal by each photo-sensor sequentially by scanning of the scanning line drive circuit, and to display properly in the display section through the supply of the data signal for display to the signal line by the signal line drive circuit.

It may be arranged so that the input and output device further includes:

a scanning line drive circuit which outputs a conducting signal for causing the second to fourth active elements to conduct so as to sequentially scan the scanning lines; and a data signal supply circuit which supplies a data signal for display to the output line.

According to the above arrangement, it is possible to properly output the detection signal by each photo-sensor sequentially by scanning of the scanning line drive circuit, and to display properly in the display section through the supply of the data signal for display to the output line by the data signal supply circuit.

Further, it may be arranged so that the input device further includes:

a plurality of scanning lines including first and second scanning lines;

a second active element, provided between the first active element and the output line, having a second control terminal connected to the first scanning line, a first terminal connected to the output line, a second terminal connected to the first terminal of the first active element, the second control terminal being supplied an input signal so that a conductivity between the first and second terminals of the second active element is controlled; and a third active element having a third control terminal connected to a second scanning line adjacent to the first scanning line, a first terminal connected to the first scanning line, and a second terminal connected to the first control terminal of the first active element, the third control terminal being supplied an input signal so that a conductivity between the first and second terminals of the third active element is controlled, the output lines and the scanning lines being provided in a matrix manner.

According to the above arrangement, when the second scanning line connected to the control terminal of the third active element is scanned by the scanning signal for conducting the second and third active elements, the potential of the second scanning line switches to High, which brings the third active element into conduction. At this point, the first scanning line connected to the first terminal of the third active element is at Low potential, causing the electrostatic capacitance to be reset.

Thereafter, in response to light input to the input device, the photo-sensor varies the holding voltage of the electrostatic capacitance, which brings the active element into conduction. In this state, when scanned by the scanning signal, the first scanning line switches to High, which brings the second active element into conduction. With this, the output voltage, as the detection signal, supplied to the output voltage supply line is taken out and sent to the output line via the first and second active elements.

As described above, in the present input device, the electrostatic capacitance is reset by the scanning signal in scanning each scanning line sequentially, so that it is possible to perform an accurate detection operation.

It may be arranged so that the input device further includes:

plural combinations of first and second scanning lines;

a second active element, provided between the first active element and the output line, having a second control terminal connected to a second scanning line in a first combination, a first terminal connected to the output line, a second terminal connected to the first terminal of the first active element, the second control terminal being supplied an input signal so that a conductivity between the first and second terminals of the second active element is controlled; and a third active element having a third control terminal connected to a first scanning line in a second combination adjacent to the first combination, a first terminal connected to the second scanning line in the first combination, and a second terminal connected to the first control terminal of the first active element, the third control terminal being supplied an input signal so that a conductivity between the first and second terminals of the third active element is controlled, the output lines and the combinations of the first and second scanning lines being provided in a matrix manner.

According to the above arrangement, when the first scanning line in the second combination connected to the control terminal of the third active element is scanned by the scanning signal for conducting the second and third active elements, the potential of the first scanning line switches to High, which brings the third active element into conduction. At this point, the second scanning line in the first combination connected to the first terminal of the third active element is at Low potential, causing the electrostatic capacitance to be reset.

Thereafter, in response to light input to the input device, the photo-sensor varies the holding voltage of the electrostatic capacitance, which brings the active element into conduction. In this state, when scanned by the scanning signal, the second scanning line in the first combination switches to High, which brings the second active element into conduction. With this, the output voltage, as the detection signal, supplied to the output voltage supply line is taken out and sent to the output line via the first and second active elements.

As described above, in the present input device, the electrostatic capacitance is reset by the scanning signal in scanning each scanning line sequentially, so that it is possible to perform an accurate detection operation.

The input device may be arranged so that the first active element is made from a switching element.

In the above input device, the photo-sensor may have a second terminal connected to the output voltage supply line.

According to the above arrangement, the holding voltage of the electrostatic capacitance is supplied from the output voltage supply line, so that it is possible to easily adjust a sensitivity of the input device by properly setting the voltage applied to the output voltage supply line. Further, it is possible to share the voltage applied to the output voltage supply line for the holding voltage of the electrostatic capacitance and the detection signal outputted to the output line.

It may be arranged so that the input device further includes a scanning line drive circuit which outputs a conducting signal for causing the second and third active elements to conduct so as to sequentially scan the scanning lines.

According to the above arrangement, it is possible to properly output the detection signal by each photo-sensor sequentially by scanning of the scanning line drive circuit.

The above input and output device may be arranged so that the display section includes an auxiliary capacitance to hold a data signal for displaying on the electro-optic device, the auxiliary capacitance having a first terminal and a second terminal, the data signal is supplied to the first terminal of the auxiliary capacitance, and a predetermined voltage is supplied via a voltage supply line for an auxiliary capacitance to the second terminal of the auxiliary capacitance, the voltage supply line for an auxiliary capacitance serving as the output voltage supply line.

According to the above arrangement, the voltage supply line for the auxiliary capacitance for the display section serves as the output voltage supply line for the sensor section, so that it is possible to reduce the required number of electrode wires, enabling simplification of the arrangement and increase in open area ratio. Further, the voltage supply line for the auxiliary capacitance for the display section is settable to a low voltage if necessary, so that in case where the voltage of the voltage supply line for the auxiliary capacitance is supplied to the output line as the detection signal, the reading circuit of the detection signal does not need to withstand a high voltage.

It may be arranged so that the input and output device further includes:

a plurality of signal lines; and a plurality of scanning lines including first and second scanning lines;

the output lines, the signal lines, and the scanning lines being provided in a matrix manner, the voltage supply line for the auxiliary capacitance being provided in a scanning-line-direction in accordance with the scanning line, wherein:

the sensor section includes a second active element and a third active element, the second active element, provided between the first active element and the output line, having a second control terminal connected to the first scanning line, a first terminal connected to the output line, a second terminal connected to the first terminal of the first active element, the second control terminal being supplied an input signal so that a conductivity between the first and second terminals of the second active element is controlled, the third active element having a third control terminal connected to a second scanning line adjacent to the first scanning line, a first terminal connected to the first scanning line, and a second terminal connected to the first control terminal of the first active element, the third control terminal being supplied an input signal so that a conductivity between the first and second terminals of the third active element is controlled, and the display section includes a fourth active element, the fourth active element having a fourth control terminal connected to the first scanning line, a first terminal connected to the signal line, a second terminal connected to a circuit on a side of the auxiliary capacitance and the electro-optic device, the fourth control terminal being supplied an input signal so that a conductivity between the first and second terminals of the fourth active element is controlled.

According to the above arrangement, in the display section, the first scanning line is scanned, which brings the firth active element into conduction. The data signal supplied to the signal line is supplied to the electro-optic device and the auxiliary capacitance to display an image.

Meanwhile, in the sensor section, when the second scanning line connected to the control terminal of the third active element is scanned by the scanning signal for conducting the second and third active elements, the potential of the second scanning line switches to High, which brings the third active element into conduction. At this point, the first scanning line connected to the first terminal of the third active element is at Low potential, causing the electrostatic capacitance to be reset.

Thereafter, in response to light input to the sensor section, the photo-sensor varies the holding voltage of the electrostatic capacitance, which brings the active element into conduction. In this state, when scanned by the scanning signal, the first scanning line switches to High, which brings the second active element into conduction. With this, the output voltage, as the detection signal, supplied to the output voltage supply line is taken out and sent to the output line via the first and second active elements.

As described above, in the present input and output device, the electrostatic capacitance is reset by the scanning signal in scanning each scanning line sequentially, so that it is possible to perform an accurate detection operation.

Further, the scanning line is shared in the sensor section and the display section, so that it is possible to reduce the required number of electrode wires, enabling simplification of the arrangement and increase in open area ratio.

It may be arranged so that the input and output device further includes:

plural combinations of first and second scanning lines, the output line in the sensor section serving as a signal line of the display section, the output lines and the plural combinations of first and second scanning lines being provided in a matrix manner, the voltage supply line for the auxiliary capacitance being provided in the scanning-line-direction in accordance with the first and second scanning lines, wherein:

the sensor section include a second active element and a third active element, the second active element, provided between the first active element and the output line, having a second control terminal connected to the second scanning line in a first combination, a first terminal connected to the output line, a second terminal connected to the first terminal of the first active element, the second control terminal being supplied an input signal so that a conductivity between the first and second terminals of the second active element is controlled, the third active element having a third control terminal connected to a first scanning line in a second combination adjacent to the first combination, a first terminal connected to the second scanning line in the first combination, and a second terminal connected to the first control terminal of the first active element, the third control terminal being supplied an input signal so that a conductivity between the first and second terminals of the third active element is controlled, and the display section includes a fourth active element, the fourth active element having a fourth control terminal connected to the first scanning line in the first combination, a first terminal connected to the output line, a second terminal connected to a circuit on a side of the auxiliary capacitance and the electro-optic device, the fourth control terminal being supplied an input signal so that a conductivity between the first and second terminals of the fourth active element is controlled.

According to the above arrangement, in the display section, the first scanning line and the second scanning line serve as a scanning line for writing and a scanning line for reading, respectively. In the display section, the first scanning line in the first combination is scanned, which brings the fourth active element into conduction. The data signal supplied to the output line is supplied to the electro-optic device and the auxiliary capacitance to display an image.

Meanwhile, in the sensor section, when the first scanning line in the second combination connected to the control terminal of the third active element is scanned by the scanning signal for conducting the second and third active elements, the potential of the first scanning line switches to High, which brings the third active element into conduction. At this point, the second scanning line in the first combination connected to the first terminal of the third active element is at Low potential, causing the electrostatic capacitance to be reset.

Thereafter, in response to light input to the sensor section, the photo-sensor varies the holding voltage of the electrostatic capacitance, which brings the active element into conduction. In this state, when scanned by the scanning signal, the second scanning line in the first combination switches to High, which brings the second active element into conduction. With this, the output voltage, as the detection signal, supplied to the output voltage supply line is taken out and sent to the output line via the first and second active elements.

As described above, in the present input device, the electrostatic capacitance is reset by the scanning signal in scanning each scanning line sequentially, so that it is possible to perform an accurate detection operation.

Further, one output line is shared for the output line of the sensor section and the signal line of the display section, so that it is possible to reduce the required number of electrode wires, enabling simplification of the arrangement and increase in open area ratio.

In the input and output device, the first active element may be made from a switching element.

In the input and output device, the photo-sensor may have a second terminal connected to the output voltage supply line.

According to the above arrangement, the holding voltage of the electrostatic capacitance is supplied from the output voltage supply line, so that it is possible to easily adjust a sensitivity of the input device by properly setting the voltage applied to the output voltage supply line. Further, it is possible to share the voltage applied to the output voltage supply line for the holding voltage of the electrostatic capacitance and the detection signal outputted to the output line.

It may be arranged so that the input and output device further includes:

a scanning line drive circuit which outputs a conducting signal for causing the second to fourth active elements to conduct so as to sequentially scan the scanning lines; and a signal line drive circuit which supplies a data signal for display to the signal line.

According to the above arrangement, it is possible to properly output the detection signal by each photo-sensor sequentially by scanning of the scanning line drive circuit, and to display properly in the display section through the supply of the data signal for display to the signal line by the signal line drive circuit.

It may be arranged so that the input and output device further includes:

a scanning line drive circuit which outputs a conducting signal for causing the second to fourth active elements to conduct so as to sequentially scan the scanning lines; and a data signal supply circuit which supplies a data signal for display to the output line.

According to the above arrangement, it is possible to properly output the detection signal by each photo-sensor sequentially by scanning of the scanning line drive circuit, and to display properly in the display section through the supply of the data signal for display to the output line by the data signal supply circuit.

It may be arranged so that the input and output device further includes:

a sensor and display panel part having combinations of the sensor section and the display section which are arranged in column and row directions.

It may be arranged so that the input and output device further includes:

a sensor and display panel part in which plural combinations of the sensor section and the display section are arranged in one area and the display sections are arranged in the other area.

It may be arranged so that the input and output device further includes:

a sensor and display panel part having the sensor section and the display section which are arranged alternately at least one by one in column and row directions.

It may be arranged so that the input and output device further includes:

a sensor and display panel part having the sensor sections and the display sections which are arranged in respective groups in different areas.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An input device, comprising:
   a plurality of output lines;
   a plurality of output voltage supply lines to which an output voltage is applied;
   a plurality of scanning lines including first and second scanning lines, the plurality of output lines and the plurality of scanning lines being provided in a matrix manner;
   a first active element having a first control terminal, a first terminal connected to the output line, and a second terminal connected to the output voltage supply line, the first control terminal being supplied an input signal so that a conductivity between the first and second terminals is controlled;
   a photo-sensor having a first terminal which is connected to the first control terminal of the first active element;
   an electrostatic capacitance, connected in parallel to the photo-sensor, having a terminal on an opposite side of the first control terminal, to which a holding voltage is supplied; and
   a third active element having a third control terminal connected to a second scanning line adjacent to the first scanning line, a first terminal connected to the first scanning line, and a second terminal connected to the first control terminal of the first active element, the third control terminal being supplied an input signal so that a conductivity between the first and second terminals of the third active element is controlled.

2. An input device according to claim 1, further comprising:
   a second active element, provided between the first active element and the output line, having a second control terminal connected o the first scanning line, a first terminal connected to the output line, a second terminal connected to the first terminal of the first active element, the second terminal being supplied an input signal so that a conductivity between the first and second terminals of the second active element is controlled.

3. The input device according to claim 2, further comprising a scanning line drive circuit which outputs a conducting signal for causing the second and third active elements to conduct so as to sequentially scan the scanning lines.

4. The input device according to claim 2, wherein the photo-sensor is a photodiode.

5. The input device according to claim 1, further comprising:
   plural combinations of first and second scanning lines;

a second active element, provided between the first active element and the output line, having a second control terminal connected to a second scanning line in a first combination, a first terminal connected to the output line, a second terminal connected to the first terminal of the first active element, the second control terminal being supplied an input signal so that a conductivity between the first and second terminals of the second active element is controlled; and the output lines and the combinations of the first and second scanning lines being provided in a matrix manner.

6. The input device according to claim 5, further comprising a scanning line drive circuit which outputs a conducting signal for causing the second and third active elements to conduct so as to sequentially scan the scanning lines.

7. The input device according to claim 1, wherein the first active element is made from a switching element.

8. The input device according to claim 1, wherein the photo-sensor has a second terminal connected to the output voltage supply line.

9. The input device according to claim 8, wherein voltages applied to the plurality of output voltage supply lines adjacent to each other are set to voltages gradually different from each other.

10. The input device as recited in claim 1, wherein the holding voltage is supplied to the electrostatic capacitance by one of the plurality of output voltage supply lines.

11. An input and output device, comprising:
a plurality of sensor sections; and
a plurality of display sections using an electro-optic device to display an image, the sensor section including:
(a) a plurality of output lines;
(b) a plurality of output voltage supply lines to which an output voltage is applied;
(c) a plurality of signal lines;
(d) a plurality of scanning lines including first and second scanning lines;
(e) a first active element having a first control terminal, a first terminal connected to the output line, and a second terminal connected to the output voltage supply line, the first control terminal being supplied an input signal so that a conductivity between the first and second terminals is controlled;
(f) a photo-sensor having a first terminal which is connected to the first control terminal of the first active element;
(g) an electrostatic capacitance, connected in parallel to the photo-sensor, having a terminal on an opposite side of the first control terminal, to which a holding voltage is supplied; and
(h) a thfrd active element, having a third control terminal connected to a second scanning line adjacent to the first scanning line, a first terminal connected to the first scanning line, and a second terminal connected to the first control terminal of the first active element, the third control terminal being supplied an input signal so that a conductivity between the first and second terminals of the third active element is controlled.

12. The input and output device according to claim 11, wherein the display section includes an auxiliary capacitance to hold a data signal for displaying on the electro-optic device, the auxiliary capacitance having a first terminal and a second terminal, the data signal is supplied to the first terminal of the auxiliary capacitance, and a predetermined voltage is supplied via a voltage supply line for an auxiliary capacitance to the second terminal of the auxiliary capacitance, the voltage supply line for an auxiliary capacitance serving as the output voltage supply line.

13. The input and output device according to claim 12, wherein:

the output lines, the signal lines, and the scanning lines are provided in a matrix manner, the voltage supply line for the auxiliary capacitance is provided in a scanning-line-direction in accordance with the scanning line, the sensor section includes a second active element and said third active element, the second active elements being provided between the first active element and the output line, and having a second control terminal connected to the first scanning line, a first terminal connected to the output line, a second terminal connected to the first terminal of the first active element, and the second control terminal being supplied an input signal so that a conductivity between the first and second terminal of the second active element is controlled, and wherein the display section includes a fourth active element, the fourth active element having a fourth control terminal connected to the first scanning line, the first terminal connected to the signal line, a second terminal connected to a circuit on a side of the auxiliary capacitance and the electro optic device, the fourth control terminal being supplied an input signal so that a conductivity between the first and second terminals of the fourth active element is controlled.

14. The input and output device according to claim 13, further comprising:

a scanning line drive circuit which outputs a conducting signal for causing the second to fourth active elements to conduct so as to sequentially scan the scanning lines; and a signal line drive circuit which supplies a data signal for display to the signal line.

15. The input and output device according to claim 12, further comprising:

plural combinations of first and second scanning lines, the output line in the sensor section serving as a signal line of the display section, the output lines and the plural combinations of first and second scanning lines being provided in a matrix manner, the voltage supply line for the auxiliary capacitance being provided in the scanning-line-direction in accordance with the first and second scanning lines, wherein:

the sensor section include a second active element and a third active element, the second active element, provided between the first active element and the output line, having a second control terminal connected to the second scanning line in a first combination, a first terminal connected to the output line, a second terminal connected to the first terminal of the first active element, the second control terminal being supplied an input signal so that a conductivity between the first and second terminals of the second active element is controlled, the third active element having a third control terminal connected to a first scanning line in a second combination adjacent to the first combination, a first terminal connected to the second scanning line in the first combination, and a second terminal connected to the first control terminal of the first active element, the third control terminal being supplied an input signal so that a conductivity between the first and second terminals of the third active element is controlled, and the display section includes a fourth active element, the fourth active element having a fourth control terminal connected to the first scanning line in the first combination, a first terminal connected to the output line, a second terminal connected to a circuit one a side of the auxiliary capacitance and the electro-optic device, the fourth control terminal being supplied an input signal so that a conductivity between the first and second terminals of the fourth active element is controlled.

16. The input and output device according to claim 15, further comprising:

a scanning line drive circuit which outputs a conducting signal for causing the second to fourth active elements to conduct so as to sequentially scan the scanning lines; and a data signal supply circuit which supplies a data signal for display to the output line.

17. The input and output device according to claim 11, wherein the first active element is made from a switching element.

18. The input and output device according to claim 11, wherein the photo-sensor has a second terminal connected to the output voltage supply line.

19. The input and output device according to claim 11, further comprising:

a sensor and display panel part having combinations of the sensor section and the display section which are arranged in column and row directions.

20. The input and output device according to claim 11, further comprising:

a sensor and display panel part in which plural combinations of the sensor section and the display section are arranged in one area and the display sections are arranged in other area.

21. The input arid output device according to claim 11, further comprising:

a sensor and display panel part having the sensor section and the display section which are arranged alternately at least one by one in column and row directions.

22. The input and output device according to claim 11, further comprising:

a sensor and display panel part having the sensor sections and the display sections which are arranged in respective groups in different areas.

23. The input and output device according to claim 11, wherein the electro-optic device is a liquid crystal.

24. The input and output device according to claim 11, wherein the electro-optic device is an organic EL device.

25. The input device as recited in claim 11, wherein the holding voltage is supplied to the electrostatic capacitance by one of the plurality of output voltage supply lines.

26. The input device as recited in claim 11, wherein the display section includes a fourth active element, the fourth active element having a fourth control terminal connected to the first scanning line, a first terminal connected to the signal line, a second terminal connected to a circuit on a side of the auxiliary capacitance and the electro-optic device, the fourth control terminal being supplied an input signal so that a conductivity between the first and second terminals of the fourth active element is controlled.

* * * * *